US011991737B2

(12) United States Patent
Liu et al.

(10) Patent No.: US 11,991,737 B2
(45) Date of Patent: *May 21, 2024

(54) ADJUSTING A PHYSICAL UPLINK CONTROL CHANNEL (PUCCH) FORMAT IN A WIRELESS COMMUNICATION NETWORK

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,504

(22) Filed: Jul. 11, 2022

(65) Prior Publication Data

US 2022/0417938 A1 Dec. 29, 2022

Related U.S. Application Data

(63) Continuation of application No. 16/315,386, filed as application No. PCT/CN2018/105740 on Sep. 14, 2018, now Pat. No. 11,388,729.

(30) Foreign Application Priority Data

Sep. 28, 2017 (WO) ................ PCT/CN2017/103917

(51) Int. Cl.
*H04W 72/542* (2023.01)
*H04L 1/1607* (2023.01)
(Continued)

(52) U.S. Cl.
CPC ......... *H04W 72/542* (2023.01); *H04L 1/1671* (2013.01); *H04L 1/203* (2013.01);
(Continued)

(58) Field of Classification Search
CPC .......... H04W 72/085; H04W 72/1284; H04W 72/0413; H04W 52/0238; H04L 1/1671; H04L 1/203; H04L 5/0007; H04L 5/0057
See application file for complete search history.

(56) References Cited

U.S. PATENT DOCUMENTS

2015/0365218 A1 12/2015 Yang et al.
2016/0329981 A1 11/2016 Chung et al.
(Continued)

FOREIGN PATENT DOCUMENTS

CN 107105490 A 8/2017
EP 3455966 A1 3/2019
(Continued)

OTHER PUBLICATIONS

3GPP, "3rd Generation Partnership Project, Technical Specification Group Radio Access Network, Evolved Universal Terrestrial Radio Access (E-UTRA), Radio Resource Control (RRC), Protocol specification, (Release 14)", 3GPP TS 36.331 V14.0.0, Sep. 2016, pp. 432-435.

(Continued)

*Primary Examiner* — Sharmin Chowdhury
(74) *Attorney, Agent, or Firm* — NICHOLSON DE VOS WEBSTER & ELLIOTT LLP

(57) ABSTRACT

Embodiments of the present disclosure provide a method and system for adjusting a physical uplink control channel (PUCCH) format in a wireless communication network. In particular, the method is implemented for adjusting a PUCCH format in an uplink transmission from a terminal device to a network device in a wireless communication network. The method comprises: using a first PUCCH format having a first duration for a service between the terminal device and the network device; and using (804) a second PUCCH format having a second and different duration for the service of the terminal device responsive to a (Continued)

determination that the first PUCCH format is in need of change based on one or more events.

20 Claims, 16 Drawing Sheets

(51) Int. Cl.
*H04L 1/20* (2006.01)
*H04L 5/00* (2006.01)
*H04W 52/02* (2009.01)
*H04W 72/21* (2023.01)

(52) U.S. Cl.
CPC .......... *H04L 5/0007* (2013.01); *H04L 5/0057* (2013.01); *H04W 52/0238* (2013.01); *H04W 72/21* (2023.01)

(56) References Cited

U.S. PATENT DOCUMENTS

| | | | |
|---|---|---|---|
| 2017/0070277 A1 | 3/2017 | Si et al. | |
| 2017/0164352 A1 | 6/2017 | Yang et al. | |
| 2017/0303148 A1 | 10/2017 | Johansson et al. | |
| 2018/0124828 A1* | 5/2018 | Kim | H04W 74/08 |
| 2018/0279295 A1* | 9/2018 | Gao | H04W 72/23 |
| 2018/0279298 A1* | 9/2018 | Wang | H04L 1/0026 |
| 2018/0324786 A1* | 11/2018 | Hooli | H04W 72/02 |
| 2018/0368137 A1 | 12/2018 | Yin et al. | |
| 2018/0368168 A1 | 12/2018 | Jung et al. | |
| 2019/0045499 A1 | 2/2019 | Huang et al. | |
| 2019/0074935 A1 | 3/2019 | Babaei et al. | |
| 2020/0205183 A1* | 6/2020 | Shen | H04L 5/0092 |
| 2020/0221444 A1 | 7/2020 | Tiirola et al. | |

FOREIGN PATENT DOCUMENTS

| | | |
|---|---|---|
| WO | 2013/097347 A1 | 7/2013 |
| WO | 2014/109569 A1 | 7/2014 |

OTHER PUBLICATIONS

Decision to Grant, EP App. No. 18815925.5, dated Feb. 4, 2021, 2 pages.

Ericsson, "Design Aspects of sPUCCH," 3GPP TSG-RAN WG1 #87, R1-1611517, Nov. 14-18, 2016, 7 pages.

Examination Report, IN App. No. 201917000198, dated Oct. 28, 2020, 7 pages.

Extended European Search Report, EP App. No. 18815925.5, dated Jun. 17, 2019, 11 pages.

First Office Action, CN App. No. 201880002887.4, dated Jan. 4, 2021, 9 pages (5 pages of English translation and 4 pages of Original document).

Huawei, HiSilicon, "NR-PUCCH Resource Determination", 3GPP TSG RAN WG1 Meeting #88bis, R1-1704211, Apr. 3-7, 2017, 4 pages.

Intention to Grant a Patent, EP App. No. 18815925.5, dated Sep. 18, 2020, 8 pages.

International Preliminary Report on Patentability (Chapter II), PCT App. No. PCT/CN2018/105740, dated Jan. 23, 2020, 13 pages.

International Search Report and Written Opinion, PCT Appl. No. PCT/CN2018/105740, dated Dec. 19, 2018, 8 pages.

Non-Final Office Action, U.S. Appl. No. 16/315,386, dated Sep. 1, 2021, 18 pages.

Notice of Allowance, U.S. Appl. No. 16/315,386, dated Mar. 9, 2022, 9 pages.

Office Action, AR App. No. P180102789, dated Oct. 29, 2021, 4 pages of Original Document Only.

Office Action, CN App. No. 201880002887.4, dated Jun. 1, 2022, 4 pages of Original Document Only.

Office Action, EP App. No. 18815925.5, dated Feb. 19, 2020, 5 pages.

Second Office Action, CN App. No. 201880002887.4, dated Nov. 30, 2021, 7 pages (2 pages of English Translation and 5 pages of Original Document).

\* cited by examiner

Measurement threshold sets to trigger a warning event for PUCCH format change 402

| Parameters / Thresholds | Threshold Values |
|---|---|
| Hysteresis 412 | Threshold Set 1 |
| Time to trigger 414 | Threshold Set 2 |
| SS-RSRP (Sync. Signal - Reference signal received power) 416 | Threshold Set 3 |
| CSI-RSRP (channel state information RSRP) 418 | Threshold Set 4 |
| SS-RSRQ (Sync. Signal - Reference signal received quality) 420 | Threshold Set 5 |
| SINR (signal-to-interference-plus-noise ratio) 422 | Threshold Set 6 |
| BLER (block error rate) 424 | Threshold Set 7 |
| CQI (channel quality indicator) 426 | Threshold Set 8 |
| Pending SR transmission attempts 428 | Threshold Set 9 |
| Transmission counts and/or latency (e.g., NACK/ACK) 430 | Threshold Set 10 |
| CSI-RS (channel state information – reference signal) 432 | Threshold Set 11 |
| Discontinuous transmission (DTX) 434 | Threshold Set 12 |
| Discontinuous reception (DRX) 436 | Threshold Set 13 |
| ⋮ | ⋮ |

Information may be carried in UCI (uplink control information) 450 { (brace covering rows 426–436) }

FIG. 4

MAC CE (control element) bit map for
PUCCH format support 750

| F7 | F6 | F5 | F4 | F3 | F2 | F1 | F0 |

Fn: Indicating a PUCCH format n being active or not using a PUCCH format index 760

MAC CE (control element) bit map for a
PUCCH resource utilization 752

| R7 | R6 | R5 | R4 | R3 | R2 | R1 | R0 |

Rn: Indicating a PUCCH format n utilizing resource indexed by the bitmap 762

MAC CE (control element) bit map for a
PUCCH configuration 754

| C7 | C6 | C5 | C4 | C3 | C2 | C1 | C0 |

Cn: Indicating a PUCCH configuration corresponding to the PUCCH format n indexed by the bitmap 764

Allocate radio resources for both a first and a second PUCCH formats for a service (e.g., a LCH/LCH group). 802

Use the first PUCCH format to support the service between the terminal device and the network device. 804

Use a second PUCCH format having a second and different duration (e.g., different number of time units) to support the service of the terminal device responsive a determination that the first PUCCH format having a first duration (e.g., a number of time units) is in need of change based on one or more events. 806

Indicate a PUCCH format update (e.g., through a MAC CE bit map such as a PUCCH format index, a resource utilization index, or a PUCCH configuration index). 808

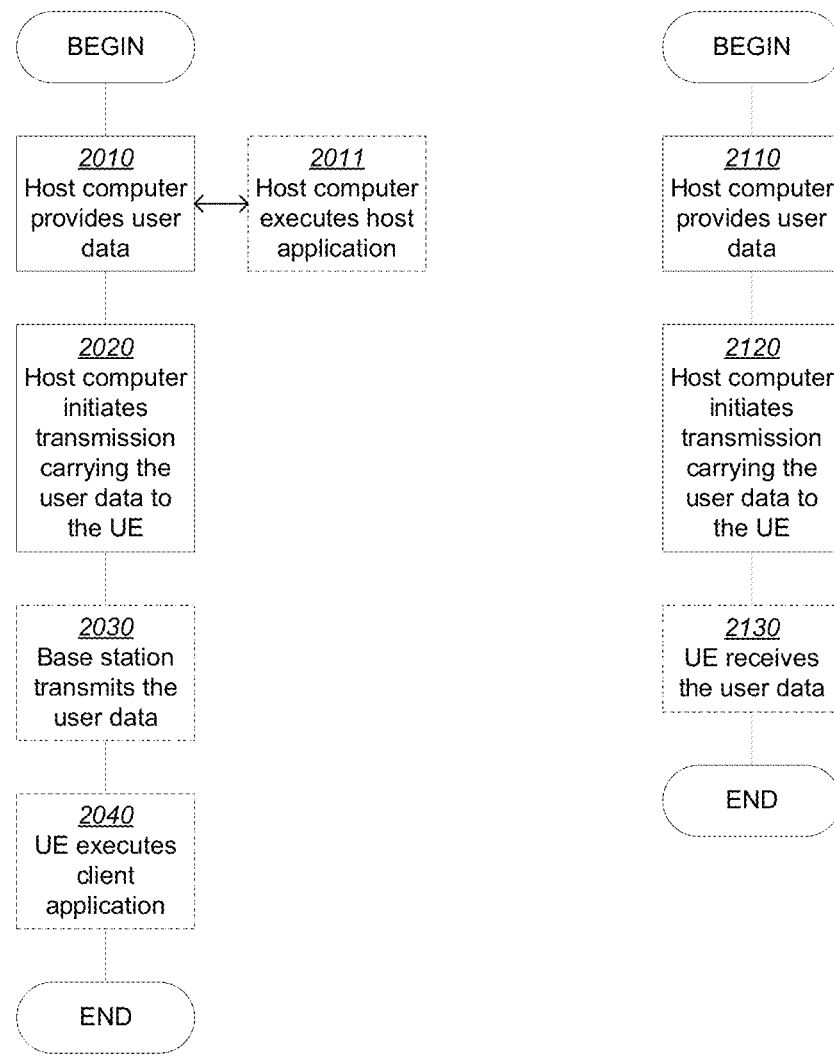

ADJUSTING A PHYSICAL UPLINK CONTROL CHANNEL (PUCCH) FORMAT IN A WIRELESS COMMUNICATION NETWORK

CROSS-REFERENCE TO RELATED APPLICATIONS

This application is a continuation of application Ser. No. 16/315,386, filed Jan. 4, 2019, which is a National stage of International Application No. PCT/CN2018/105740, filed Sep. 14, 2018, which claims priority to International Application No. PCT/CN2017/103917, filed Sep. 28, 2017, which are hereby incorporated by reference.

TECHNICAL FIELD

Embodiments of the present disclosure relate to the field of wireless communications, and more specifically, relate to a method and system for adjusting a physical uplink control channel (PUCCH) format in a wireless communication network.

BACKGROUND ART

In a wireless communication network, a network device (e.g., a base station) transmits signals to a terminal device (e.g., a user equipment (UE)) through a downlink; reversely, the terminal device transmits signals to the network device through an uplink. An uplink includes an uplink physical control channel (PUCCH) that carries information from the terminal device to the network device.

A PUCCH carries a set of information called uplink control information (UCI). Depending on the information that the UCI in the PUCCH needs to carry, PUCCH may take on different formats. For example, in the long-term evaluation (LTE), PUCCH may take on one of the defined Formats 1-5 and their variations such as Format 1a, 1b, 2a, and 2b. In a radio frame, a PUCCH often takes 4 to 14 orthogonal frequency domain multiplexing (OFDM) symbols to transmit in one or more slots.

SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect of the present disclosure, a method is implemented for adjusting a physical uplink control channel (PUCCH) format in an uplink transmission from a terminal device to a network device in a wireless communication network. The method comprises using a first PUCCH format having a first duration for a service between the terminal device and the network device. The method further comprises using a second PUCCH format having a second and different duration for the service of the terminal device responsive to a determination that the first PUCCH format is in need of change based on one or more events.

In an embodiment, the method may further comprise allocating radio resources for both the first and the second PUCCH formats for the service prior to the determination.

In a further embodiment, the one or more events may comprise a quality measurement of communication between the terminal device and the network device over one or more thresholds.

In another embodiment, the quality measurement of communication may include one or more of a channel quality indicator, a block error rate, a number of scheduling request attempts, and a number of successful or failed hybrid automatic repeat request (HARQ) transmissions or acknowledgement thereof.

In yet another embodiment, the quality measurement of communication may be a measurement of a reference signal.

In yet another embodiment, the quality measurement of communication may be at least one of a hysteresis and a time to trigger.

In yet another embodiment, the quality measurement of communication may be a measurement of discontinuous transmission (DTX) or discontinuous reception (DRX).

In a further embodiment, using the second PUCCH format may comprise allocating radio resources for the second PUCCH format while using a first PUCCH format for the service, releasing radio resources that are used by the first PUCCH format to be deactivated after the allocation of the radio resources for the second PUCCH format completes, and performing PUCCH transmission using the second PUCCH format for the service.

In another embodiment, the method may further comprise indicating a PUCCH format update using a media access control (MAC) control element (CE) bitmap.

In yet another embodiment, the method may further comprise indicating a PUCCH format update using a media access control (MAC) control element (CE) comprising a PUCCH configuration index.

In yet another embodiment, the time units may comprise orthogonal frequency domain multiplexing (OFDM) symbols in one or more slots of a radio frame.

According to a second aspect of the present disclosure, there is provided a non-transitory machine-readable storage medium that provides instructions. The instructions, when executed by a processor of a terminal device, cause the processor to perform the method according to the first aspect of the present disclosure.

According to a third aspect of the present disclosure, there is provided a terminal device. The terminal device comprises a non-transitory machine-readable storage medium to store instructions and a processor coupled with the non-transitory machine-readable storage medium to process the stored instructions, causing the terminal device to perform the method according to the first aspect of the present disclosure.

According to a fourth aspect of the present disclosure, there is provided a network device. The network device comprises a radio interface and processing circuitry configured to cause the terminal device to use a first PUCCH format having a first duration for a service between the terminal device and the network device and to cause the terminal device to use a second PUCCH format having a second and different duration for the service of the terminal device responsive to a determination that the first PUCCH format is in need of change based on one or more events.

BRIEF DESCRIPTION OF THE DRAWINGS

The present disclosure may best be understood by referring to the following description and accompanying drawings that illustrate embodiments of the present disclosure. In the drawings:

FIG. 4 illustrates sets of thresholds to trigger a warning event for PUCCH format change per an embodiment of the present disclosure.

FIG. 7 illustrates an activity status of PUCCH formats per an embodiment of the present disclosure.

FIG. 8 is a flow diagram illustrating the operations for PUCCH format change in a wireless communication network per an embodiment of the present disclosure.

FIG. 20 is a flowchart illustrating a method implemented in a communication system, in accordance with an embodiment.

FIG. 21 is a flowchart illustrating a method implemented in a communication system, in accordance with an embodiment.

DETAILED DESCRIPTION

Figure 1A:
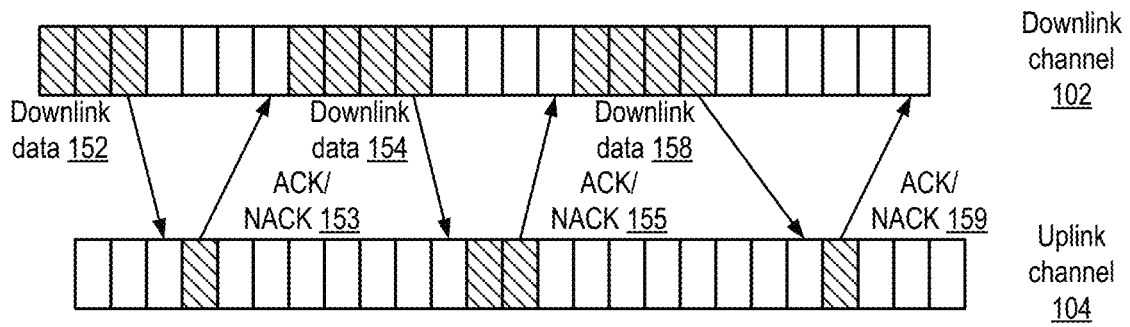
FIG. 1A illustrates a short PUCCH format per an embodiment of the present disclosure.

The following description describes methods and apparatus for adjusting a physical uplink control channel (PUCCH) format in an uplink transmission from a terminal device to a network device in a wireless communication network. Embodiments of the present disclosure offer efficient ways to adjust a PUCCH format. Through adjusting the PUCCH format, a network device and a terminal device may transmit data and control information more efficiently.

In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. One skilled in the art will appreciate, however, that the present disclosure may be practiced without such specific details. In other instances, control structures, gate level circuits and full software instruction sequences have not been shown in detail in order not to obscure the present disclosure. Those of ordinary skill in the art, with the included descriptions, will be able to implement proper functionality without undue experimentation.

Bracketed text and blocks with dashed borders (such as large dashes, small dashes, dot-dash, and dots) may be used to illustrate optional operations that add additional features to the embodiments of the present disclosure. Such notation, however, should not be taken to mean that these are the only options or optional operations, and/or that blocks with solid borders are not optional in some embodiments of the present disclosure.

Terms

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the present disclosure may be implemented using different combinations of software, firmware, and/or hardware.

A wireless communication network is a network of electronic devices communicating using radio waves (electromagnetic waves within the frequencies 30 KHz-300 GHz). A wireless communication may follow wireless communication standards, such as new radio (NR), LTE-Advanced (LTE-A), LTE, wideband code division multiple access (WCDMA), High-Speed Packet Access (HSPA). Furthermore, the communications between the electronic devices such as network devices and terminal devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

A network device (ND) is an electronic device in a wireless communication network via which a terminal device accesses the network and receives services therefrom. The network device may refer to a base station (BS) or an access point (AP), for example, a node B (NodeB or NB), an evolved NodeB (eNodeB or eNB), a next generation node B (gNB), remote radio unit (RRU), a radio header (RH), a remote radio head (RRH), a relay, and a low power node such as a femtocell and a picocell.

A terminal device is an electronic device that may access a wireless communication network and receive services from the wireless communication network. For example, a terminal device may be a user equipment (UE), which may be a subscriber station (SS), a portable subscriber Station, a mobile station (MS), or an access terminal (AT). The terminal device may be one of a mobile phone, a cellular phone, a smart phone, a tablet, a wearable device, a personal digital assistant (PDA), a portable computer, an image capture terminal device such as a digital camera, a gaming terminal device, a music storage and playback appliance, a vehicle-mounted wireless terminal device, a smart speaker, a set-top box.

A terminal device may include one or more physical antennas. An antenna port of the terminal device may or may not correspond to a physical antenna. The antenna port may be logical entities distinguished by their reference signal sequences. Multiple antenna port signals may be transmitted on a single transmit antenna, and a single antenna port may be spread across multiple transmit antennas.

Wireless Communication Network and PUCCH Formats of Various Symbol Lengths

A wireless communication network may use a PUCCH format with a predefined orthogonal frequency domain multiplexing (OFDM) symbol (or simply "symbol," which refers to an OFDM symbol within a radio frame unless specified otherwise) length. Once the OFDM symbol length is defined for a terminal device, the terminal device uses the OFDM symbol length for its PUCCH. A PUCCH length for a wireless communication network is often set to be a value between 4-14 symbols. Recently, a shorter PUCCH length, such as one between 1-2 symbols in time duration, is discussed in the 5G NR (new radio) effort. To differentiate the different PUCCH lengths, we may refer to a PUCCH format using 4-14 symbols as a long PUCCH format (or PUCCH long duration, PUCCH-LD), in contrast to a PUCCH format using 1-2 symbols as a short PUCCH format (or PUCCH short duration, PUCCH-SD).

Note that terms long and short PUCCH formats are relative. In an embodiment, a wireless communication network may limit the short PUCCH format to be one within 3-symbol length within a slot of a radio frame (e.g., (1) only the length of one symbol, (2) length of either one or two symbols, or (3) length of any of 1-3 symbols may be called a short PUCCH) and allows the long PUCCH format to be one between the length of 4-14 symbols. In an alternative embodiment, a short PUCCH format may use an even longer symbol length (e.g., any one of symbol length between 1-7 symbols), and the corresponding long PUCCH format has a PUCCH length outside of the short PUCCH format.

FIG. 1A illustrates a short PUCCH format per an embodiment of the present disclosure. As illustrated, downlink data 152 is transmitted through a downlink channel 102 from a network device to a terminal device using three OFDM symbols. In response to the downlink data 152, the terminal device may transmit an acknowledgement (ACK) or negative acknowledgment (NACK) 153 to the network device through an uplink channel 104, indicating whether the terminal device successfully receives the data. In this example, one symbol is transmitted through a PUCCH for the ACK/NACK 153. The ACK/NACK 153 may be a hybrid automatic repeat request (HARQ), which performs error-control for data transmission that uses acknowledgements and timeout to achieve reliable data transmission over an unreliable link.

The uplink channel 104 for the ACK/NACK may be referred to as a PUCCH. The PUCCH may carry one or more of scheduling request (SR), ACK/NACK, channel quality information (CQI), and channel state information (CSI) report. The ACK/NACK may be an acknowledgment or negative acknowledgment in a variety of protocols, and they may be one of HARQ ACK/NACK, single-input single-output (SISO) ACK/NACK, multiple-input multiple output (MIMO) ACK/NACK, or single-input multiple-output (SIMO) ACK/NACK.

The communication between the network device and the terminal device may continue, and the network device may transmit downlink data 154 to the terminal device, which responds with an ACK/NACK 155. In this example, the ACK/NACK 155 is transmitted using two symbols. The network device may then transmit downlink data 158 to the terminal device, which responds with an ACK/NACK 159.

Figure 1B:
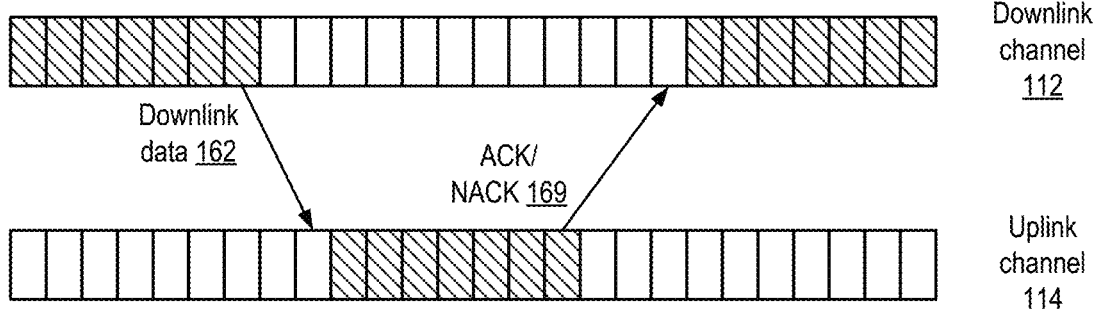
FIG. 1B illustrates a long PUCCH format per an embodiment of the present disclosure.

The ACK/NACK signals in FIG. 1A uses 1-2 symbols, and we refer them as using a short PUCCH format. In contrast, FIG. 1B illustrates a long PUCCH format per an embodiment of the present disclosure. The downlink data 162 is transmitted through a downlink channel 112 from a network device to a terminal device using seven OFDM symbols. In response to the downlink data 162, the terminal device may transmit an ACK/NACK 169 to the network device through an uplink channel 114, indicating whether the terminal device successfully receives the data. The ACK/NACK 169 uses eight symbols, and we refer them as using a long PUCCH format.

Figure 2A:
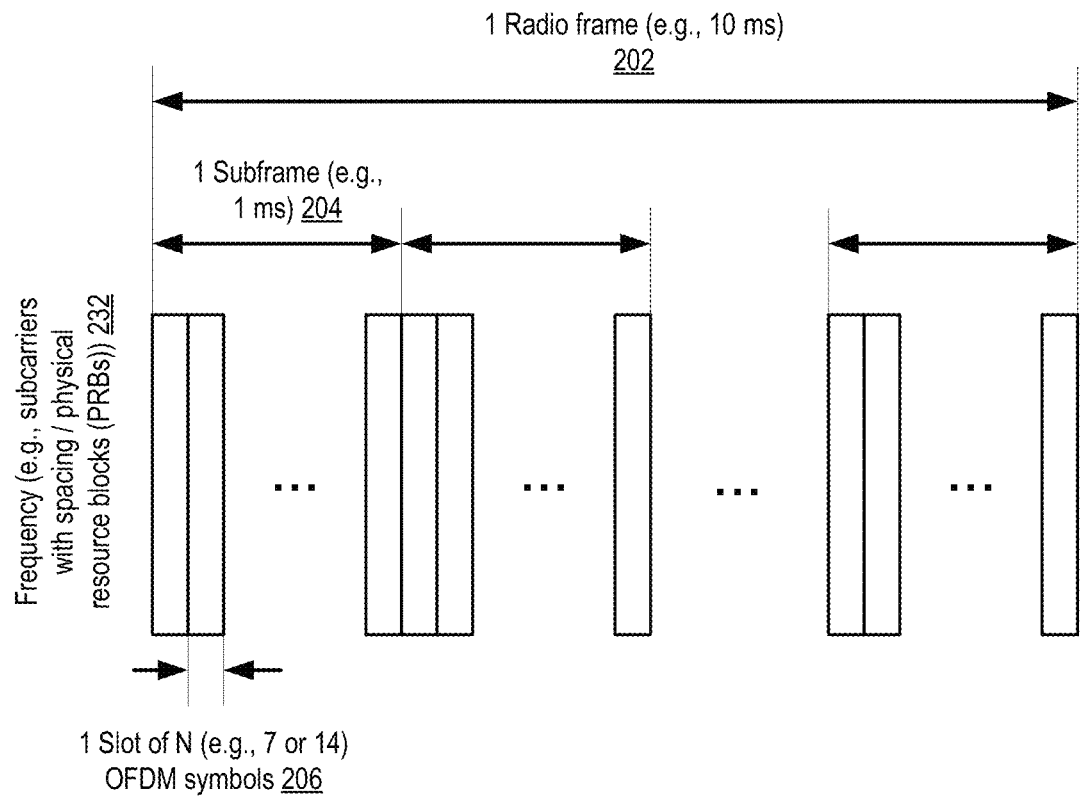
FIG. 2A illustrates an exemplary signal transmission hierarchy in which a PUCCH operates.

The symbols used for the ACK/NACKs may be belong to one or more slots in a radio frame. FIG. 2A illustrates an exemplary signal transmission hierarchy in which a PUCCH operates. The exemplary signal transmission hierarchy includes the transmission unit of frame such as radio frame 202. A radio frame 202 takes ten milliseconds to transmit in an embodiment. The frame may contain a number of subframes such as subframe 204. In this example, the radio frame 202 contains ten subframes, each takes one millisecond. Each subframe may contain a number of slots. For example, a subframe may contain two slots. Each slot such as the slot at reference 206 may contain a number of symbols. In one example, a slot contains either 7 or 14 OFDM symbols.

The frame-subframe-slot-symbol hierarchy is an example of time domain hierarchy. In the frequency domain (as illustrated at reference 232), each symbol may be transmitted over a number of subcarriers. A symbol may be transmitted using a number of physical resource blocks (PRBs), each of which may contain 12 subcarriers in one embodiment. In an embodiment, each subcarrier includes a bandwidth (e.g., 7.5 kHZ or 15 kHZ) for transmission. One subcarrier x one symbol may be referred to as a resource element (RE), which is the smallest unit of resource to be allocated for signal transmission in an embodiment.

The illustrated frame structure offers an example for signal transmission. In this frame structure or other frame structures, a PUCCH uses the lowest level of time unit (symbol level in this case). When a PUCCH is in a short PUCCH format, the symbols for one PUCCH signal may be within one slot of a subframe.

When a PUCCH is in a long PUCCH, the symbols for the PUCCH signal may extend over a plurality of slots within a subframe. In an alternative embodiment, the symbols used in the long PUCCH are within a signal slot of the subframe. In other words, the terminal device may use a PUCCH format that repeatedly takes the symbol positions within a subframe or a radio frame to increase its PUCCH transmission rate.

Figure 2B:
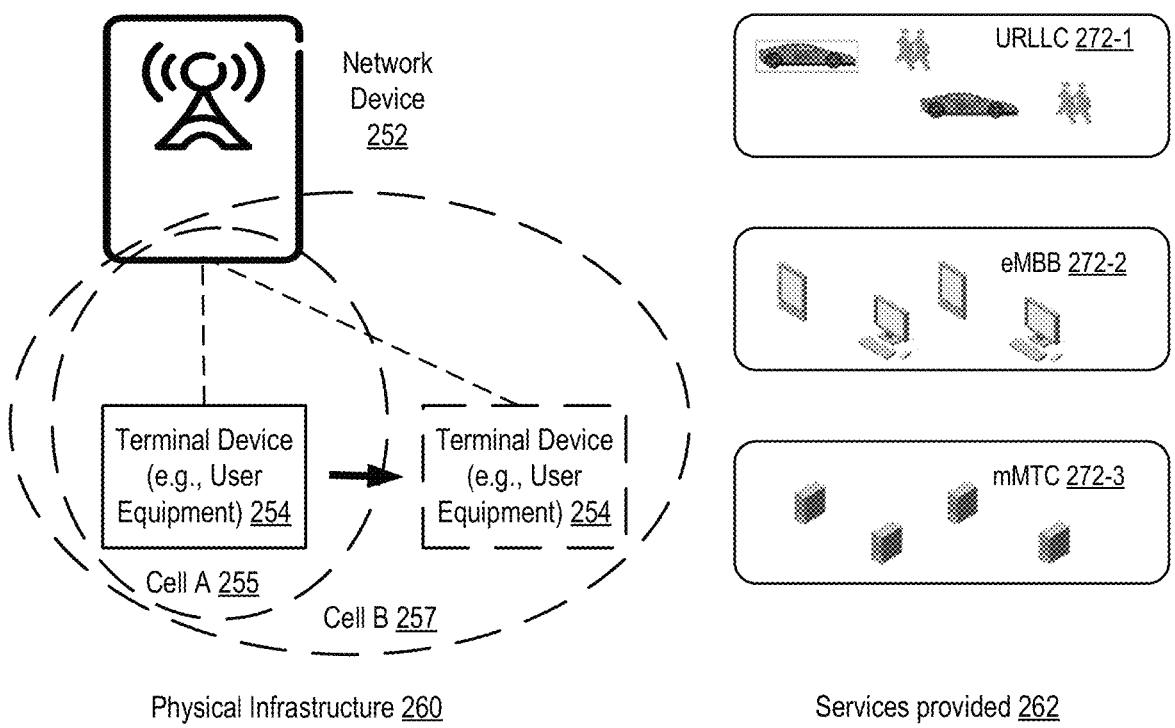
FIG. 2B illustrates a wireless communication network Implementing PUCCH formats of various symbol lengths per an embodiment of the present disclosure.

FIG. 2B illustrates a wireless communication network implementing PUCCH formats of various symbol lengths per an embodiment of the present disclosure. The wireless communication network is implemented in a physical infrastructure 260 and provides services 262.

In one embodiment, the services provided include three types, depending on different Quality of Service (QoS) requirements: ultra-reliable and low latency communication (URLLC) 272-1, enhanced mobile broadband (eMBB) 272-2, and massive machine type communication (mMTC) 272-3.

URLLC 272-1 has strict QoS requirements, especially in terms of latency and reliability. However, such URLLC services usually also have relatively low data rates and possible sparse data transmission. Such services may include ones used in automatic drive/automatic control.

mMTC 272-3 typically supports high connection density and requires a long battery lifetime but does not require a low delay or a high data rate, and it is often combined with small infrequent packets. Such services may include ones used in intelligent agriculture.

eMBB 272-2 requires high data rate. Delay can be strict but typically less strict than in URLLC. Such services may include ones used in high definition (HD) video services.

These services are provided through the physical infrastructure 260, which includes one or more network devices such as a network device 252, and each network device manages one or more terminal devices such as a terminal device 254. The terminal device 254 may provide multiple services to a user of the terminal device, and each service may have a different QoS requirement. Each service may be provided through one or more logical channels (LCHs) or logical channel groups (LCGs). The terminal device 254 and network device 252 may identify the LCHs and LCGs using local channel identifiers (LCH IDs) and LCG IDs, respectively. A service may be identified by its corresponding LCH ID and/or LCG ID in one embodiment.

To satisfy different QoS requirements of different services, a PUCCH for a service may be allocated with a PUCCH format using a suitable symbol length. For example, an eMBB service may be less delay sensitive than a URLLC service, thus it may use a long PUCCH format. The URLLC service may use a short PUCCH format to be able to meet the stricter delay requirement. That is, a short PUCCH format allows a terminal device to communicate with a network device more often than a long PUCCH format, other conditions being the same. Thus, a short PUCCH format may be suitable for a delay sensitive service that has a lower data rate, such as a URLLC service. One shortcoming of a short PUCCH format is that it may have a shorter cellular coverage than a long PUCCH format.

A long PUCCH format allows the terminal device to provide more information within a PUCCH signal than the short PUCCH format, and such PUCCH signal with the long PUCCH format may be transmitted less often than a PUCCH signal with the short PUCCH format. For example, the PUCCH signal with a long PUCCH format in FIG. 1B (i.e., ACK/NACK 169) can provide more information than a short PUCCH format in FIG. 1A (e.g., ACK/NACK 153). Because the long PUCCH format may provide more information within a given PUCCH signal, a terminal device may transmit the PUCCH signals with a long PUCCH format less often than ones with a short PUCCH format. A long PUCCH format may be suitable for a high data rate service that can tolerate some delay, such as eMBB or mMTC. Note that the selection of a short or long PUCCH format depends on many factors; the described selections are for illustration only. Other/contrary selections may be implemented due to factors not discussed in this Specification, and the principle of the present disclosure is not limited to a particular selection of the PUCCH format.

In FIG. 2B, the terminal device 254 may implement an eMBB service that requires a high data rate but is delay tolerant, and a long PUCCH format may be used for the eMBB service. The terminal device 254 may also implement a URLLC service that requires ultra-reliability and low latency but a low data rate, and a short PUCCH format may be used for the URLLC service. Thus, the terminal device 254 uses the short and long PUCCH formats at the same time when it is located within the coverage of cell A at reference 255. The terminal device 254 then moves to another location (e.g., a user carrying the terminal device 254 travels to a different location through automobile, train, or flight), which is outside of cell A. In this example, the terminal device 254 is within the coverage of cell B at reference 257. The cell B may have different beamforming characteristics and the short PUCCH format may be insufficient to serve the URLLC service due to the short PUCCH format's coverage limitation. In that case, to support the URLLC service, the terminal device 254 should switch the PUCCH format for the URLLC service to a long PUCCH format, which typically has a better cellular coverage. Such switch may cause a service outage, which may violate the QoS requirement of the URLLC service.

Figure 3:
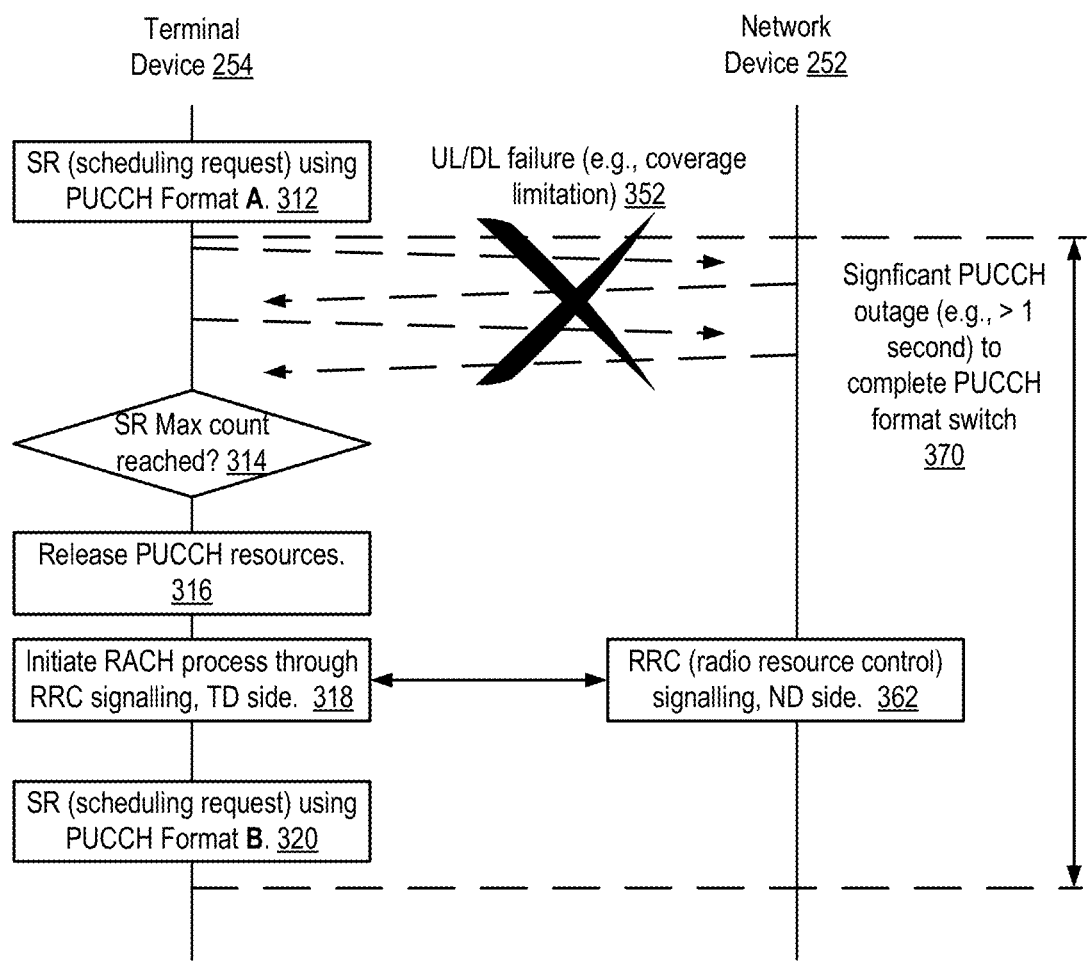
FIG. 3 illustrates a PUCCH format switch that causes PUCCH outage for a service.

FIG. 3 illustrates a PUCCH format switch that causes PUCCH outage for a service. At reference 312, the terminal device 254 issues a scheduling request (SR) using a PUCCH format A with one symbol length for a service. The service may be a URLLC service as discussed above, and the PUCCH format A may be a short PUCCH format using 1-3 symbols within a slot of a radio frame. Note that transmission of the SR is only an exemplary usage of the corresponding PUCCH, which may also transmit one or more of ACK/NACK, CQI, and/or CSI reports.

The transmission of SR (or other information) fails at reference 352. The failure may be caused by the uplink (UL) and/or downlink (DL) issues such as cellular coverage limitation or link congestion. The terminal device 254 may retransmit the SR when it does not receive an acknowledgement from the network device 252 within a time period. The retransmission will continue when no acknowledgement from the network device 252 is received at the terminal device 254.

At reference 314, the terminal device 254 determines whether a maximum transmission attempt count is reached. In one embodiment, the max transmission attempt count is kept as a variable such as dsr-TransMax (a dynamic spectrum request—transmission maximum). The dsr-TransMax may be a value of 4, 8, or another number. Thus, once the dsr-TransMax is reached, the terminal device 254 no longer transmits the SR. Instead, it releases the resources that the PUCCH has allocated at reference 316.

A PUCCH may consume a variety of radio resources. For example, the terminal device 254 may allocate physical resource blocks (PRBs), demodulation reference signals (DMRS), sounding reference signals (SRS), orthogonal cover codes (OCC), etc., for the PUCCH. Once the terminal device 254 determines that the PUCCH fails (e.g., no responsive upon reaching the number of dsr-TransMax transmission attempts), it releases the resources taken by the PUCCH.

Then the terminal device 254 initiates a random-access channel (RACH) access to recover at reference 318 from the failed PUCCH. The RACH access may use radio resource control (RRC) signaling, and the network device 252 responds with RRC signaling at reference 362. The RACH signaling determines a new PUCCH format such as a PUCCH format B to be used for the service, replacing the failed PUCCH format A. Based on the failure of PUCCH format A, the network device 252 and/or the terminal device 254 may determine that a long PUCCH format is preferable to overcome a coverage limitation of the failed short PUCCH format for example. At reference 320, the terminal device 254 uses the new PUCCH format B for the service.

The switch between a short PUCCH format to a long PUCCH format may depend on a variety of factors relating to network condition and the QoS requirement. For example, the switching from a short PUCCH format to a long PUCCH format may result in a more reliable transmission, but the long PUCCH format may also mean that the PUCCH communication may be performed less often. In a different scenario, it may be preferable for a service to switch from a long PUCCH format to a short PUCCH format so that the PUCCH communication is more frequent and results in shorter delay.

The initiation of RACH process is to achieve uplink synchronization between the terminal device 254 and the network device 252, and to obtain resource for RRC requests. Note that RACH process is only an example of reestablishing the uplink synchronization between the terminal device and the network device, and other protocols may be used for the uplink synchronization. For example, other processes include performing an access probe in code division multiple access (CDMA) and performing a channel request in GSM (global system for mobile communication). All of the initiation processes typically take a significant time duration to complete.

Through the process from references 312 to 320, the terminal device 254 switches a service's PUCCH format from one length to another. During that time, the corresponding PUCCH for the service is out of service. Considering that the PUCCH is already out of service when the SR is not acknowledged by network device, one can see that the PUCCH outage during the PUCCH format switch at reference 370 is the sum of the time that takes to reach the maximum transmission count and the RACH process followed. The sum of the time can be over one second. Thus, the outage of the PUCCH for the service likely won't satisfy the requirement of a URLLC service, as a URLLC service often requires data transmission within one or only a few milliseconds, and the control signaling PUCCH running at a rate several orders slower won't be acceptable.

In some cases, a terminal device may move back and forward between cells. For example, the terminal device 254 may move between the cell A 255 and cell B 257 multiple times throughout a single day or hour, and if each time the PUCCH format switch (either from a short PUCCH format to a longer PUCCH format or vice versa) takes a second or so to complete, the impact on a delay-sensitive service such as a URLLC service is catastrophic.

Thus, in this and other scenarios, a faster PUCCH format adjustment is desirable.

Events to Trigger a PUCCH Format Adjustment

In the example illustrated in FIG. 3, the significant PUCCH outage may be due to two main factors: (1) the terminal device determines that a new PUCCH format is needed only after the maximum transmission attempt count is reached; and (2) the terminal device and the network device reestablish the uplink synchronization through a process such as RACH, after the allocated radio resources for the existing PUCCH format are released. Thus, it is desirable to (1) identify other events to trigger the PUCCH format adjustment, where the other events may be detected sooner than the time taken to reach the maximum transmission attempt count, and (2) avoid the reestablishment of the uplink synchronization through the process such as RACH.

FIG. 4 illustrates sets of thresholds to trigger a warning event for PUCCH format change per an embodiment of the present disclosure. The table 402 lists a number of parameters for which the sets of thresholds are established. Each threshold set may include one or more threshold values. Each of the parameters may be measured individually to determine that a PUCCH format change is required; or alternatively, several parameters may be measured and the threshold crossing (going over or under a threshold) events of these parameters in combination may cause the determination that the PUCCH format change is required. Note that the PUCCH format change or adjustment discussed herein refers to a change between a long and short PUCCH formats unless explicitly indicated otherwise. A PUCCH format change/adjustment without changing the symbol length is possible, for example, a PUCCH format may change from one of Formats 1-5 and their variations to another within the formats. Yet those PUCCH format changes do not improve cellular coverage of the PUCCH and/or the PUCCH transmission rate. Thus, the PUCCH format change/adjustment discussed herein involves the change of the symbol length taken by a PUCCH, unless explicitly indicated otherwise.

The hysteresis 412 may measure the signal strength gap between a serving cell and a neighboring cell. The time to trigger (TTT) 414 may measure the required time to maintain the signal strength gap between the serving cell and the neighboring cell within a range (e.g., the range between (1) received signal strength of serving cell−the hysteresis and (2) received signal strength of serving cell+the hysteresis). Once the hysteresis 412 and/or TTT 414 are over the corresponding sets of thresholds, a PUCCH format change may be triggered. Thus, no reestablishing the uplink synchronization is required for the PUCCH format change, and the detection of the threshold crossing events may happen much quicker than the time that a terminal device takes to reach the maximum transmission attempt count.

Additionally, a PUCCH format change may be triggered by PUCCH channel measurements such as synchronization signal—reference signal received power (SS-RSRP) 416, channel state information RSRP (CSI-RSRP) 418, and synchronization signal—reference signal received quality (SS-RSRQ) 420.

Furthermore, a PUCCH format change may also be triggered by other radio channel quality indicators, such as signal-to-interference-plus-noise ratio (SINR) 422 and block error rate (BLER) 424. These measurements may be for either uplink or downlink, and they can be for a control signaling channel or a data transmission channel.

Additional radio channel quality indicators for a PUCCH format change may be carried in uplink control information (UCI) at reference 450, including channel quality indicator (CQI) 426, pending SR transmission attempts 428 (which should be less than the maximum transmission attempt count), and transmission count and/or latency 430. The transmission count may measure the number of ACK/NACKs (e.g., HARQ ACK/NACKs) received in a given time duration. The transmission latency may measure latency between a terminal device sending a first pending SR until the time that the terminal device receives a corresponding uplink grant from the network device.

When beam forming is configured for a terminal device, a parameter for beam level radio quality, such as a channel state information reference signal (CSI-RS) 432, may also be used for a PUCCH format change determination.

Another type of measure for the determination of PUCCH format change is a discontinuous transmission (DTX) 434 and discontinuous reception (DRX) 436. A DTX measures one or more transmissions (e.g., an ACK/NACK) that a network device is supposed to receive from a terminal device but do not. A DRX measures one or more transmission (e.g., a transmission from PDCCH (physical downlink control channel)) that a terminal device is supposed to receive from a network device but do not.

Table 402 is an exemplary but incomplete list of parameters and their corresponding threshold sets for making a PUCCH format change determination. Each of the parameters (and other similar parameters) can be measured and compared with one threshold set containing one or more values. Based on the measurement values of the parameters and their corresponding threshold values, a terminal device and/or a network device may determine whether a PUCCH format change is needed.

Some of the measurements in FIG. 4 can be performed by a terminal device only, others by a network device only, and the remaining by both the terminal device and network device. The threshold sets may be stored partially or wholly in the terminal device or the network device. In other words, information contained in Table 402 may partially or wholly stored in the terminal device and/or the network device. When the measurements can't be performed by one entity (e.g., the terminal device), the other entity (e.g., the network device) may provide the measurements/threshold values to the one entity through a control channel, and the one entity may use the measurement and the threshold values for determining whether a PUCCH format change should be triggered.

Perform a PUCCH Format Change

Figure 5:
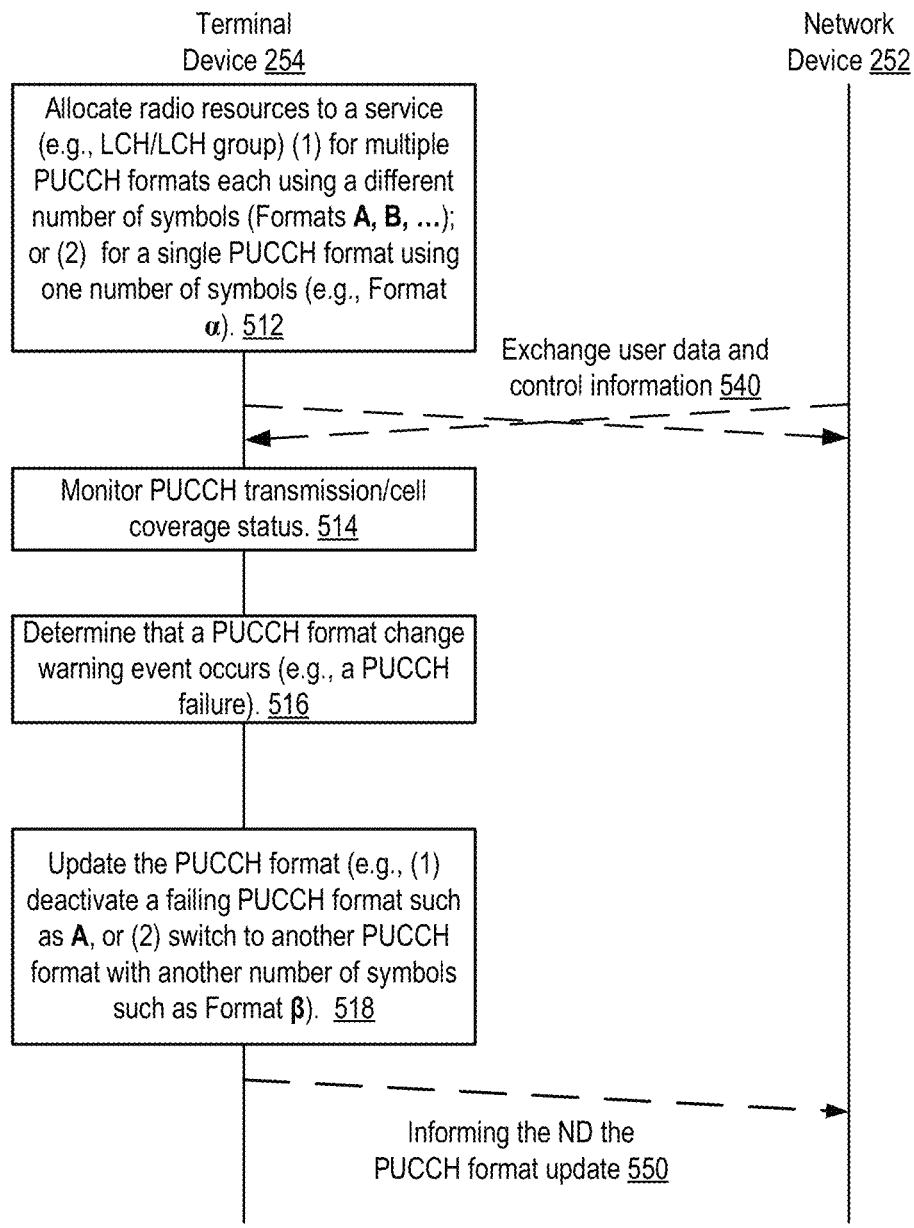
FIG. 5 illustrates a PUCCH format change performed by a terminal device per embodiments of the present disclosure.

FIG. 5 illustrates a PUCCH format change performed by a terminal device per embodiments of the present disclosure. The terminal device 254 and network device 252 are the same as the terminal device and the network device with the same reference number discussed herein above.

At reference 512, the terminal device 254 may allocate radio resources to a service for multiple PUCCH formats, each of which uses a different number of symbols. For example, the terminal device may allocate a set of radio resources (including physical resource blocks (PRBs), demodulation reference signals (DMRS), sounding reference signals (SRS) and/or orthogonal cover codes (OCC), etc.) for a short PUCCH format (e.g., Format A) and a different set of radio resources for a long PUCCH format (e.g., Format B). Both the short and long formats are for one single service to be served through communication between the terminal device 254 and the network device 252. The single service may correspond to a logical channel (LCH) and/or a logical channel group (LCG). The allocation at reference 512 may be caused by the network device 252, which may issue a command/control message, and the terminal device responsively allocates the radio resources.

In alternative, the terminal device 254 may allocate radio resource to a service for a single PUCCH format (called format α) using a number of symbols at reference 512. The single PUCCH format may be a short PUCCH format or a long PUCCH format, and we assume that PUCCH format α is a short PUCCH format in this example.

Following reference 512, a single PUCCH may be established for the service using the single PUCCH format; or, a number of PUCCHs may be established for the service using the multiple PUCCH formats. The terminal device 254 and network device 252 may then exchange user data and control information between each other at reference 540. While the communication between the terminal device 254 and network device 252 is ongoing, the terminal device 254 monitors PUCCH transmission and cell coverage status at reference 514.

The monitoring includes the terminal device 254 performs measurements to get measurement values, and/or the network device 252 performs measurements and provides the measurement(s) to the terminal device 254 through the control information. The monitored measurements may be for one or more parameters, within or similar to the ones corresponding to 412-436 in Table 402 of FIG. 4.

At reference 516, the terminal device 254 may determine that a PUCCH format change warning event occurs. The warning event may be that one or more measurements obtained at reference 516 are over the corresponding threshold values of threshold sets. The warning event may indicate that a PUCCH format is working improperly. For example, the PUCCH Format A or Format a causes too many transmission failures in its PUCCH. The measurements may be for one or more uplink and/or downlink radio channel quality measures, within or similar to the ones corresponding to 412-436 in Table 402 of FIG. 4.

In addition or in alternative, the warning event may be a detection of PUCCH transmission phase needs to be changed. A PUCCH transmission typically starts off with a slow start phase. In a slow start phase, the terminal device 254 may exponentially increases its transmission window (also called as a congest window, which is a time window through which the terminal device may transmit data consecutively before waiting for acknowledgement from the network device) upon acknowledgement being received from the network device 252 (e.g., a grant transmitted from the network device). When the transmission window reaches a certain threshold, the PUCCH transmission enters a normal transmission phase (sometimes referred to as congestion avoidance phase) where the transmission window is increased much slower. In the slow start phase, it is desirable that the terminal device 254 interacts with the network device 252 quickly and a given PUCCH signal carrying less information is acceptable. Thus, a shorter PUCCH format may be preferable to a longer PUCCH format in the slow start phase, all other conditions being equal. In contrast, a longer PUCCH format carries more information in a given PUCCH signal than a shorter PUCCH format. Thus, a longer PUCCH format may be preferable to a shorter PUCCH format in the normal transmission phase.

Because of the different preference of PUCCH formats in different transmission phases, the terminal device 254 and the network device 252 may determine in which transmission phase the PUCCH for a service is transmitted, and use that determination to decide whether to update the PUCCH format for the service.

The terminal device 254 may determine the PUCCH transmission phase based on the transmission rate and error rate (e.g., BLER measurement) of data and control information at the terminal device. For example, when the terminal device 254 determines that the PUCCH transmission rate reaches a threshold, it may determine that the slow start phase has completed, and the normal transmission phase is to be started. The terminal device 254 may also determine the PUCCH transmission phase based on that one or more measurements obtained at reference 516 is over the corresponding threshold values of threshold sets, within or similar to the ones in Table 402 of FIG. 4. For example, the terminal device 254 may determine that a packet loss event occurs (e.g., the BLER is high and causes the packet loss), thus the slow start phase has completed, and the normal transmission phase is to be started.

The network device 252 may determine that the slow start phase is completed by comparing the achieved data rate with an estimated capacity for the terminal device 254 in a radio interface. The capacity for the terminal device 254 can be estimated based on the bandwidth, channel status, and the transmission/receiving power of the terminal device 254. When the achieved data rate is close enough to the estimated capacity (the difference of the two is within a threshold value), the network device 252 determine that the slow start phase is completed.

At reference 518, the terminal device 254 updates the PUCCH format for the service. The terminal device 254 may deactivate a failing PUCCH format such as the Format A used by the service. Then the terminal device uses only the remaining PUCCH format such as the Format B for the service. In one embodiment, the deactivation means that the service no longer uses the failing (or disfavored) PUCCH format, but the service does not release the radio resources associated with the failing PUCCH format. The PUCCH Format B is a longer PUCCH format in this example. Alternatively, the terminal device 254 updates the PUCCH format for the service by switching to another PUCCH format with another number of symbols such as from Format α to Format β, which may be a long PUCCH format.

At reference 550, the terminal device 254 informs that the network device 252 that its PUCCH format for the service has been updated. The message from the terminal device 254 may indicate which PUCCH format is used after the update. Note the operation in reference 550 is optional in one embodiment. The network device 252 may monitor multiple PUCCH formats of the service simultaneously, and it may detect that the PUCCH format change based on the monitoring without the information from reference 550.

The discussion regarding the references 512-550 relates to a PUCCH format change from a short PUCCH format to a long PUCCH format. Yet the same references 512-550 may be used for a PUCCH format change from a long PUCCH format to a short PUCCH format. One difference is that the terminal device 254 determines that a PUCCH format change to a shorter PUCCH format is needed at reference 516. The terminal device 254 may use threshold values of threshold sets, within or similar to the ones in Table 402 of FIG. 4. The threshold values may be the same or different from the threshold values for the PUCCH format change from a short to a long PUCCH format. In other words, a threshold set in Table 402 may have different threshold values for the PUCCH format change (1) from a long to a short PUCCH format and (2) from a short PUCCH format to a longer PUCCH format.

Figure 6:
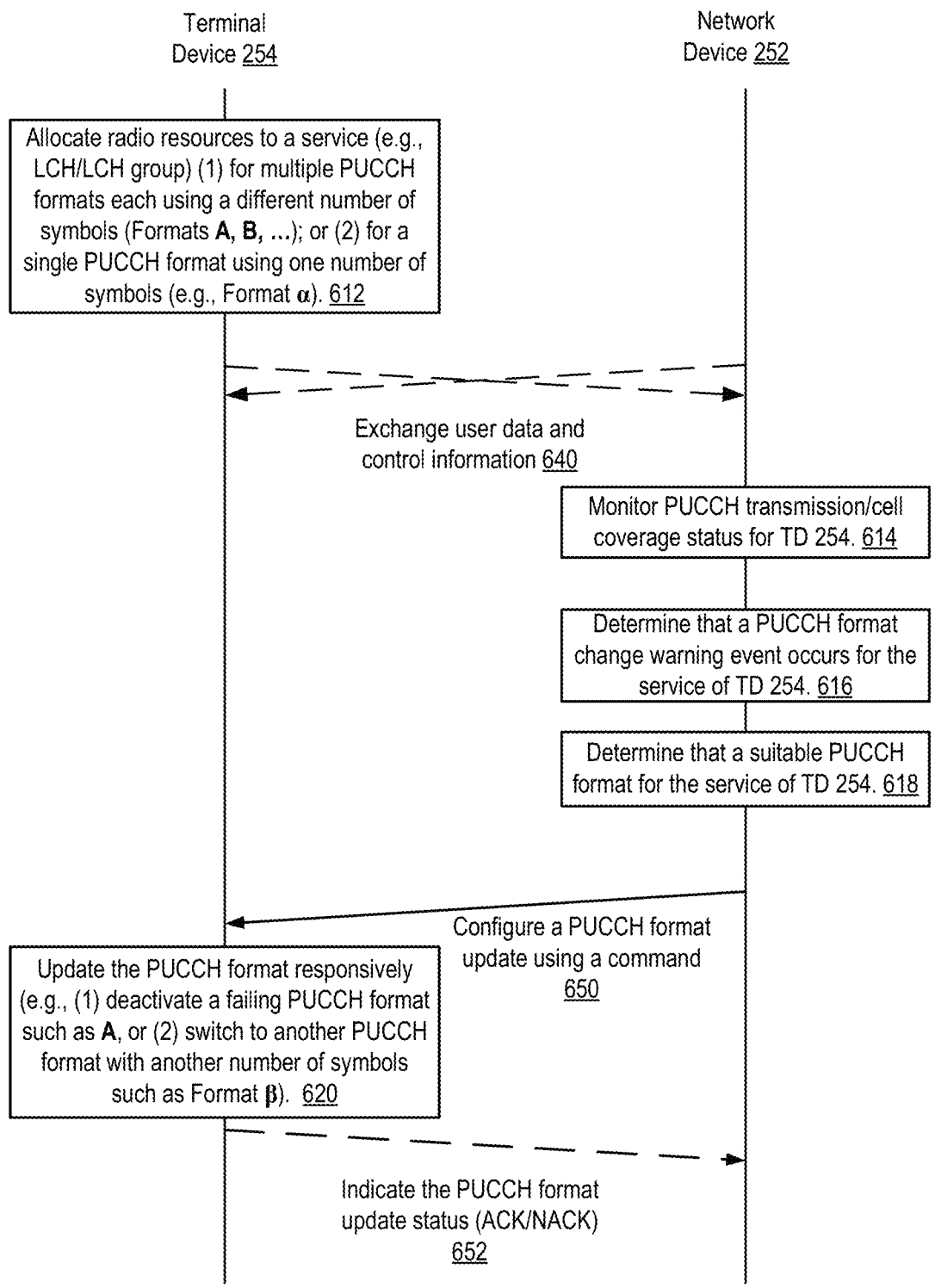
FIG. 6 illustrates a PUCCH format change performed by a network device per embodiments of the present disclosure.

FIG. 6 illustrates a PUCCH format change performed by a network device per embodiments of the present disclosure. FIG. 6 is similar to FIG. 5, and the initial PUCCH format may be set by the network device 252 as discussed herein above relating to reference 512 of FIG. 5. One difference in FIG. 6 is that instead of the terminal device 254, the network device 252 determines that the PUCCH format change warning event occurs for the service of the terminal device 254. The network device 252 then makes the determination of a suitable PUCCH format for the service of the terminal device 254 and cause the terminal device to switch to the suitable PUCCH format.

As discussed relating to Table 402 FIG. 4, a network device may perform some of the discussed measurements. For the ones the network device can't perform, a terminal device may provide the measurement data (and/or the corresponding threshold sets) to the network device through a control channel. Then the network device 252 may determine whether a PUCCH format change warning event occurs for the service of the terminal device 254. The network device 252 may then determine a suitable PUCCH format for the service of the terminal device 254. For example, the service of the terminal device 254 uses a long PUCCH format at reference 612. The network device 252 determines that the radio channel quality indicators indicate that the cellular coverage for the terminal device 254 is good enough (e.g., DTX is low) and the service prefers a shorter response time for the corresponding service of the terminal device 254. The network device 252 may decide that a short PUCCH format is preferred to the existing long PUCCH format.

After the network device 252 determines the suitable PUCCH format for the service of the terminal device 254, it configures a PUCCH format update using a command at reference 650. The terminal device 254 responsively update the PUCCH format at reference 620, and the operations of the PUCCH format update may be similar to the one discussed relating to reference 518.

At reference 652, the terminal device 254 informs the network device 252 whether the PUCCH format update is successful (e.g., ACK for a successful update and NACK for a failed one). The network device 252 may decide how to proceed based on the information. For example, the network device 252 may decide a different long (or short) PUCCH format update is better if NACK is received for a request to change to a long PUCCH format. That is, if the network device 252 receives a NACK for changing to a longer PUCCH format of 14 symbols, the network device 252 may decide to request a change of another PUCCH format of 4 symbols. By negotiation between the network device 252 and the terminal device 254, an optimal PUCCH format may be achieved.

During the communication between the network device 252 and the terminal device 254, the status of a PUCCH format may be indicated in a radio resource control message, a new media access control element (MAC CE), or another open system interconnection (OSI) physical layer (Layer 1 or L1) or data link layer (Layer 2 or L2) signaling. The status of the PUCCH format may indicate the current PUCCH format or the expected PUCCH format. For example, the terminal device 254 may indicate the current PUCCH format through signaling at reference 550. The network device 252 may indicate the expected PUCCH format after an update at reference 650.

FIG. 7 illustrates an activity status of PUCCH formats per an embodiment of the present disclosure. The activity status of PUCCH format may be indicated using a bit map, where each bit indicates whether the corresponding PUCCH format is active.

At reference 760, a bit map to be transmitted through a MAC CE is illustrated. The bit map contains 8 bits, and each bit may indicate a PUCCH format being active (e.g., bit value of one) or inactive (e.g., bit value of zero). The bit values may be reversed to indicate the PUCCH format activity (e.g., bit value zero indicating active and one indicating inactive). Thus, the bit map 760 represents an PUCCH format index, and it may indicate the activity status of up to eight PUCCH formats for a service. Each PUCCH format may be defined as containing a number of symbols (e.g., from very short PUCCH format with one symbol within a slot to a very long with 14 symbols within the slot). In one embodiment, being active means that radio resources are allocated for the PUCCH format and the corresponding PUCCH is used for the service; and being inactive means that the radio resources are allocated for the PUCCH format but the corresponding PUCCH is not used. In an alternative embodiment, while being active means the same, being inactive means that the radio resources for the PUCCH format is released.

In addition or in alternative to reference 760, another MAC CE bit map at reference 762 may be utilized. In the bit map 762, each bit corresponds to a PUCCH resource index. The PUCCH resource index maps to the radio resources that the PUCCH format uses. By identifying the PUCCH resource index being active or inactive, the bit map 762 indicates the active and inactive PUCCH format for the service.

Further, another MAC CE bit map at reference 764 may be used in addition or in alternative to the bit maps at references 760 and 762. In the bit map 764, each bit corresponds to a PUCCH configuration index. The PUCCH configuration index maps to a configuration that the PUCCH format uses. By identifying the PUCCH configuration index being active or inactive, the bit map 764 indicates the active and inactive PUCCH format for the service.

Flow Diagrams: PUCCH Format Change

The operations in the flow diagrams will be described with reference to the exemplary embodiments of the other figures. However, the operations of the flow diagrams can be performed by embodiments of the present disclosure other than those discussed with reference to the other figures, and the embodiments of the present disclosure discussed with reference to these other figures can perform operations different than those discussed with reference to the flow diagrams.

FIG. 8 is a flow diagram illustrating the operations for PUCCH format change in a wireless communication network per an embodiment of the present disclosure. The operations of method 800 may be performed by a terminal device such as the terminal device 254 or the combination of the terminal device and a network device such as the network device 252. The method is performed for adjusting a physical uplink control channel (PUCCH) format in an uplink transmission from the terminal device to the network device.

Optionally at reference 802, the terminal device allocates radio resources for at least two PUCCH formats for a service. The service may be provided through one or more logical channels (LCHs) or logical channel groups (LCGs), and the service thus may be represented using the ID of the one or more LCHs or LCGs. Each of the PUCCH formats has a different duration (e.g., measured in different number of time units). In one embodiment, each time unit in a duration is an OFDM symbol in one or more slots of a radio frame. For example, one PUCCH format may use one of 1-3 symbols within a slot of a radio frame (e.g., a short PUCCH format), and each slot within the radio frame, or a number of slots within the radio frame, may repeatedly use the same symbol positions for the one of 1-3 symbols. Another PUCCH format may use one of 4-14 symbols within a slot of a radio frame (e.g., a long PUCCH format), and similarly each slot within the radio frame, or a number of slots within the radio frame, may repeatedly use the same symbol positions for the one of 4-14 symbols.

In one embodiment, the numbers of time units of the two PUCCH formats differ at how often the time units are repeated in a radio frame. For example, a first PUCCH format may use symbols #3-4 in slot #0 of subframe #4 in a radio frame such as the radio frame 202 (which contains 10 subframes). A second PUCCH may use symbols #5-6 in slot #1 of the same subframe #4 in addition to the symbol #5-6 in slot 0. By repeating the symbol positions within a subframe, the second PUCCH format runs at a doubled transmission rate comparing to the first PUCCH format, even though both uses the same symbol length of two. Additionally, the second PUCCH format may repeat the symbol positions within a radio frame (e.g., using symbols #3-4 in slot #0 of subframe #5 in addition to the subframe #4) to increase its PUCCH transmission rate without changing the symbol length of the PUCCH. Embodiments of the present disclosure include PUCCH format changes from one symbol length to another and from one symbol repetition level to another symbol repetition level.

At reference 804, the terminal device uses a first PUCCH format for the service between the terminal device and the network device. In one embodiment, the terminal device allocates the radio resources for a first and a second PUCCH formats for the service yet uses the corresponding first but not the second PUCCH to transmit control data to the network device (e.g., the first PUCCH format is active and the second PUCCH is inactive). The network device may monitor the two PUCCHs corresponding to the two PUCCH formats, even though one of them is inactive. In an alternative embodiment, the terminal device uses the two PUCCHs corresponding to the two PUCCH formats for the service to transmit control data to the network device (e.g., both PUCCH formats are active). The usage of the first PUCCH format of reference 804 may be caused by the network device 252, which may issue a command/control message, and the terminal device responsively uses the first PUCCH format.

In one embodiment of method 800, the terminal device allocates radio resource for a single PUCCH format (e.g., the first PUCCH format) for the service. In that case, the network device monitors only the single PUCCH format for the service.

At reference 806, the terminal device uses a second PUCCH format having a second and different duration (e.g. measured in number of time units) for the service of the terminal device responsive to a determination that the first PUCCH format having the first duration (e.g., a first number of time units) is in need of change based on one or more events.

In one embodiment, the one or more events comprise a quality measurement of communication between the terminal device and the network device over one or more thresholds. For example, the quality measurement of the communication may be one within or similar to the ones corresponding to 412-436 in Table 402 of FIG. 4.

In one embodiment, the quality measurement of communication includes one or more of a channel quality indicator, a block error rate, a number of scheduling request attempts, and a number of successful or failed hybrid automatic repeat request (HARQ) transmissions or acknowledgement thereof.

In one embodiment, the quality measurement of communication is a measurement of a reference signal. The measurement may be one of a synchronization signal—reference signal received power (SS-RSRP), a channel state information RSRP (CSI-RSRP), and a synchronization signal—reference signal received quality (SS-RSRQ).

In one embodiment, the quality measurement of communication is at least one of a hysteresis and a time to trigger.

In one embodiment, the quality measurement of communication is a measurement of discontinuous transmission (DTX) or discontinuous reception (DRX).

In one embodiment, the one or more events comprise a change of phase of data transmission between the terminal device and the network device. For example, the change of phase may be between a slow start phase and a congest avoidance phase of the data transmission through a PUCCH.

Each determination of reference 806 may involve the comparison of obtained one or more measurements to a threshold set, which may contain one or more threshold values. The crossing or close to the threshold values may lead to the determination that the first PUCCH format is in need of change.

As discussed relating to FIGS. 5-6, the determination may be made by the terminal device and/or the network device in embodiments of the present disclosure. When the determination is made by the network device, the network device indicates a required PUCCH format change (resulting in using the second PUCCH format in this example) using a command to the terminal device. The command may indicate the required PUCCH format state. In one embodiment, the required PUCCH format state may be communicated through an MAC CE bitmap, such as one or more of a PUCCH format index, a PUCCH resource index, or a PUCCH configuration index. Responsive to the command, the terminal device performs the PUCCH format update as discussed relating to FIG. 6. In that case, the usage of the second PUCCH format at reference 806 is caused by the network device 252

Note that operations at reference 806 may be for a PUCCH format switch. In that case, only one PUCCH format was active for a service at reference 804, and operations at reference 806 deactivate the earlier active PUCCH format and activate an earlier inactive PUCCH format. The operations at reference 806 may also be for a PUCCH format update. In that case, two or more PUCCH formats were active earlier (e.g., at reference 804), and operations at reference 806 deactivate the one or more PUCCH formats that are determined in need of change. One or more remaining PUCCH formats may stay active for the service.

Optionally, once the PUCCH format change is complete, the PUCCH format update may be indicated by a radio resource control message, an MAC CE, or another L1 or L2 signaling. For example, the PUCCH format update may be indicated using an MAC CE bitmap, such as one or more of a PUCCH format index, a PUCCH resource index, or a PUCCH configuration index.

Figure 9:
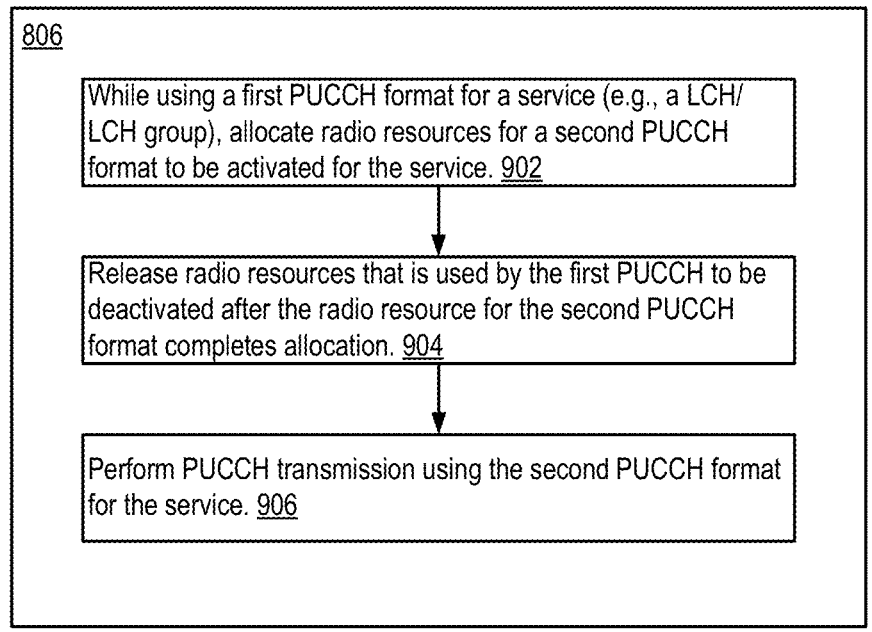
FIG. 9 illustrates a PUCCH format change per an embodiment of the present disclosure.

Note that the using of the second PUCCH format may be performed in a way to minimize PUCCH outage. FIG. 9 illustrates a PUCCH format change per an embodiment of the present disclosure. In one embodiment, the operations within FIG. 8 is an embodiment of operations within reference 806 of FIG. 8.

At reference 902, when a terminal device uses a first PUCCH format for a service, it allocates radio resources for a second PUCCH format to be activated for the services. At reference 904, the terminal device releases radio resources that are used by the first PUCCH format to be deactivated after the allocation of the radio resources for the second PUCCH format completes. At reference 906, the terminal device performs PUCCH transmission using the second PUCCH format for the service.

Figure 10:
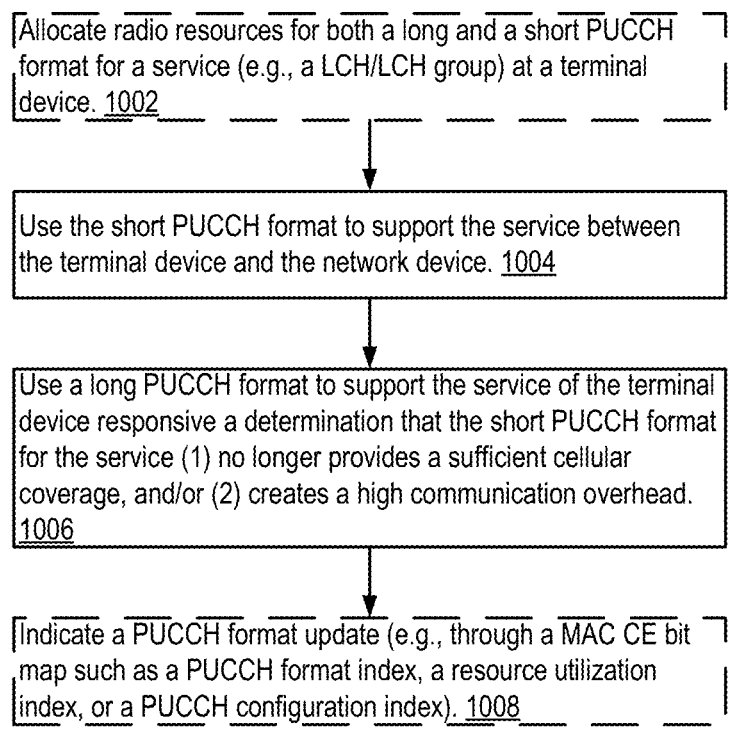
FIG. 10 illustrates a PUCCH format change to gain a better cellular coverage and/or less communication overhead per an embodiment of the present disclosure.

FIG. 10 illustrates a PUCCH format change to gain a better cellular coverage and/or less communication overhead per an embodiment of the present disclosure. Operations of method 1000 may be an embodiment of operations of method 800, and the same or similar operations are not repeated.

One difference between the two is that the at least two PUCCH formats in FIG. 8 are limited to specific PUCCH formats that one is a short PUCCH format and the other is a longer PUCCH format at reference 1002. In addition, the short PUCCH format is active for the service at reference 1004.

At reference 1006, a determination is made that the short PUCCH format for the service (1) no longer provides a sufficient cellular coverage, and/or (2) creates a high communication overhead. The determination may be made by either the terminal device or the network device. As discussed relating to 806, the determination may be based on one or more events relating to FIG. 4. Responsively, the terminal device uses the long PUCCH format to provide a sufficient cellular coverage and/or less communication overhead.

Figure 11:
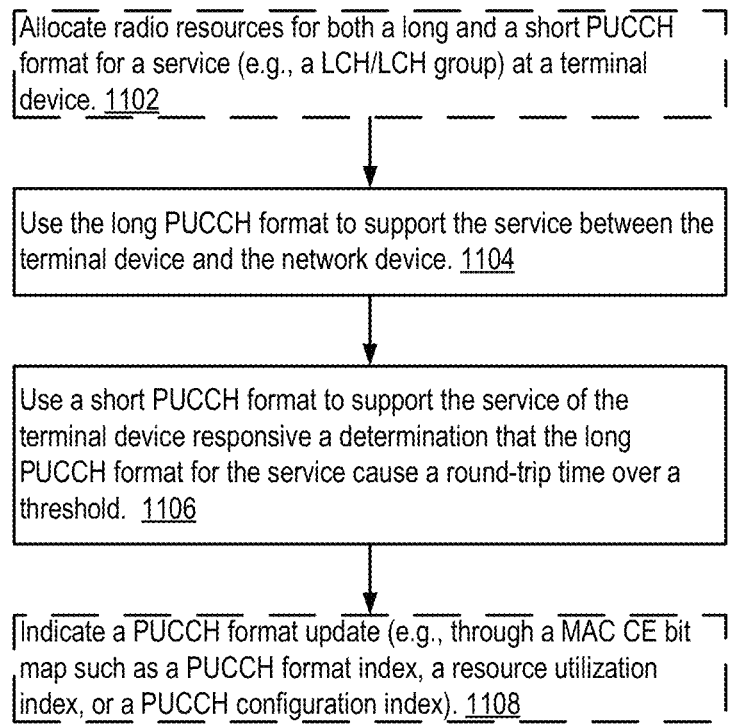
FIG. 11 illustrates a PUCCH format change to gain a shorter round-trip time for data transmission per an embodiment of the present disclosure.

FIG. 11 illustrates a PUCCH format change to gain a shorter round-trip time for data transmission per an embodiment of the present disclosure. Operations of method 1100 may be an embodiment of operations of method 800, and the same or similar operations are not repeated.

One difference between the two is that the at least two PUCCH formats in FIG. 8 are limited to specific PUCCH formats that one is a short PUCCH format and the other is a longer PUCCH format at reference 1102. In addition, the long PUCCH format is active for the service at reference 1104.

At reference 1106, a determination is made that the long PUCCH format for the service causes a round-trip time for data transmission over a threshold. The threshold may correspond to a QoS requirement of the service. The determination may be made by either the terminal device or the network device. As discussed relating to 806, the determination may be based on one or more events relating to FIG. 4. Responsively, the terminal device uses the short PUCCH format to provide a shorter round-trip time for data transmission.

Figure 12:
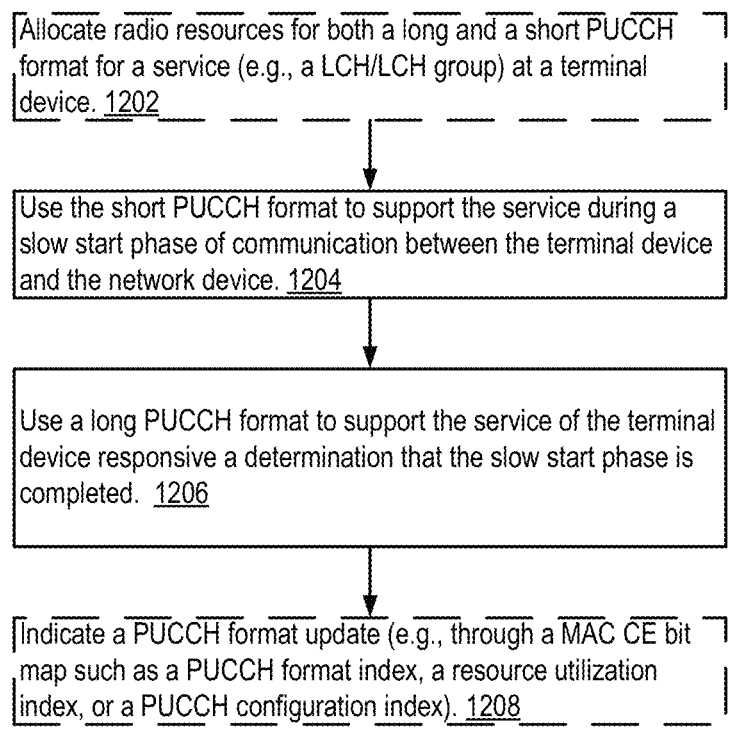
FIG. 12 illustrates a PUCCH format change based on a change of phase of data transmission between a terminal device and a network device per an embodiment of the present disclosure.

FIG. 12 illustrates a PUCCH format change based on a change of phase of data transmission between a terminal device and a network device per an embodiment of the present disclosure. Operations of method 1200 may be an embodiment of operations of method 800, and the same or similar operations are not repeated.

One difference between the two is that the at least two PUCCH formats in FIG. 8 are limited to specific PUCCH formats that one is a short PUCCH format and the other is a longer PUCCH format at reference 1102. In addition, the short PUCCH format is active for the service at reference 1104. The short PUCCH format is used for the slow start phase of the communication between the terminal device and the network device.

At reference 1206, a determination is made that the slow start phase is completed. The determination may be made by either the terminal device or the network device as discussed relating to FIG. 5. Responsively, the terminal device uses the long PUCCH format to provide a higher PUCCH transmission rate.

Through operations of embodiments of the present disclosure as discussed herein above, PUCCH outage is reduced significantly as a terminal device may update a PUCCH format as the cellular coverage and/or data transmission state changes. The dynamic change with different symbol length of PUCCH formats allow a PUCCH to adapt to the changing cellular coverage (based on one or more warning events discussed relating to FIG. 4) and data transmission state (e.g., data transmission phase changes as discussed herein above). Additionally, the PUCCH format change does not require the reestablishment of an uplink synchronization through a process such as RACH, which is a time-consuming process. Thus, embodiments of the present disclosure provide a more robust PUCCH using the PUCCH adjustment.

Electronic Devices Utilizing Embodiments of the Present Disclosure

Figure 13:
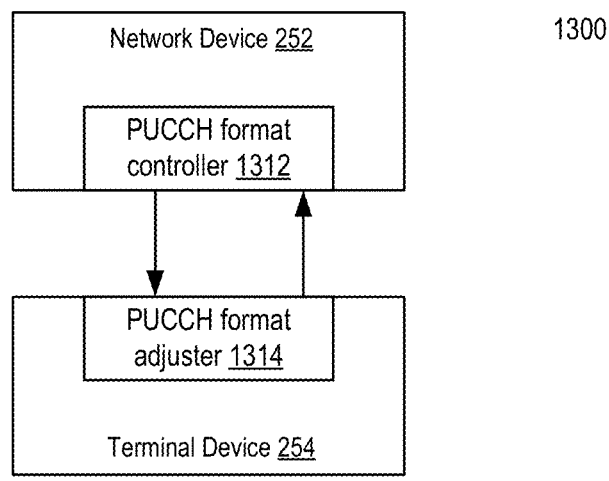
FIG. 13 illustrates a wireless communication system containing a network device and a terminal device per an embodiment of the present disclosure.

FIG. 13 illustrates a wireless communication system containing a network device and a terminal device per an embodiment of the present disclosure. The wireless communication system 1300 contains the network device 252 and the terminal device 254. The network device 252 includes a PUCCH format controller 1312, which performs the network device's operations as discussed relating to FIGS. 5-12. The terminal device 254 includes a PUCCH format adjuster 1314, which performs the terminal device's operations as discussed relating to FIGS. 5-12.

Figure 14:
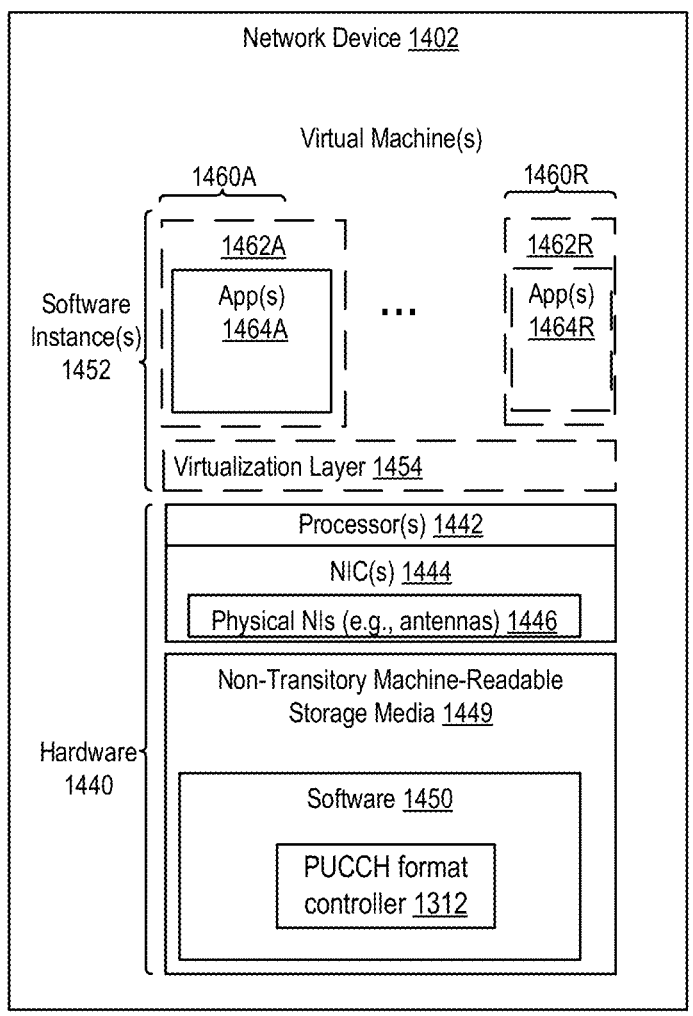
FIG. 14 illustrates a network device per an embodiment of the present disclosure.

FIG. 14 illustrates a network device per an embodiment of the present disclosure. The network device 1402 may comprise the network device 252. The network device 1402 may be implemented using custom application—specific integrated—circuits (ASICs) as processors and a special-purpose operating system (OS), or common off-the-shelf (COTS) processors and a standard OS.

The network device 1402 includes hardware 1440 comprising a set of one or more processors 1442 (which are typically COTS processors or processor cores or ASICs) and physical NIs 1446, as well as non-transitory machine-readable storage media 1449 having stored therein software 1450. During operation, the one or more processors 1442 may execute the software 1450 to instantiate one or more sets of one or more applications 1464A-R. While one embodiment does not implement virtualization, alternative embodiments may use different forms of virtualization. For example, in one such alternative embodiment the virtualization layer 1454 represents the kernel of an operating system (or a shim executing on a base operating system) that allows for the creation of multiple instances 1462A-R called software containers that may each be used to execute one (or more) of the sets of applications 1464A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment the virtualization layer 1454 represents a hypervisor (sometimes referred to as a virtual machine monitor (VMM)) or a hypervisor executing on top of a host operating system, and each of the sets of applications 1464A-R run on top of a guest operating system within an instance 1462A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1440, directly on a hypervisor (in which case the unikernel is sometimes described as running within a LibOS virtual machine), or in a software container, embodiments can be implemented fully with unikernels running directly on a hypervisor represented by virtualization layer 1454, unikernels running within software containers represented by instances 1462A-R, or as a combination of unikernels and the above-described techniques (e.g., unikernels and virtual machines both run directly on a hypervisor, unikernels and sets of applications that are run in different software containers).

The software 1450 contains the PUCCH format controller 1312 that performs operations performed by a network device as discussed to FIGS. 5-12. The PUCCH format controller 321 may be instantiated within the applications 1464A-R. The instantiation of the one or more sets of one or more applications 1464A-R, as well as virtualization if implemented, are collectively referred to as software instance(s) 1452. Each set of applications 1564A-R, corresponding virtualization construct (e.g., instance 1562A-R) if implemented, and that part of the hardware 1540 that executes them (be it hardware dedicated to that execution and/or time slices of hardware temporally shared), forms a separate virtual network device 1560A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). The physical network interface 1546 may include one or more antenna of the network device 1402. An antenna port may or may not correspond to a physical antenna.

Figure 15:
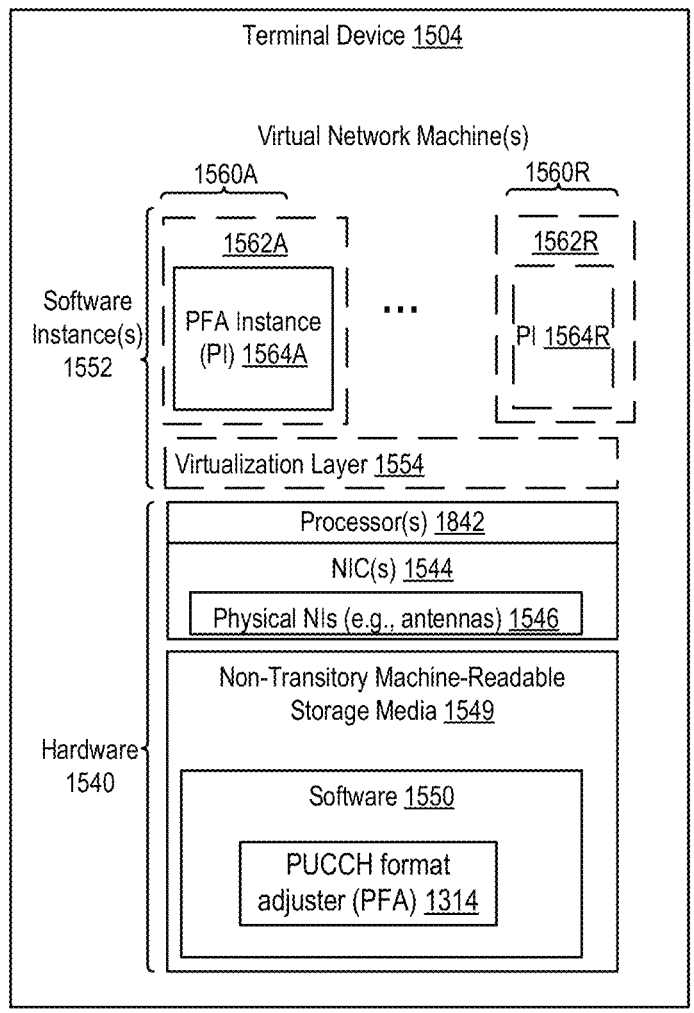
FIG. 15 illustrates a terminal device per an embodiment of the present disclosure.

FIG. 15 illustrates a terminal device per an embodiment of the present disclosure. The terminal device 1504 may comprise the terminal device 254. The terminal device 1504 as illustrated may contain similar or different hardware/software comparing to the network device 1402. The functional blocks in FIG. 15 with similar reference numbers as FIG. 14 may perform same or similar functions. Particularly, the physical network interface 1546 may include one or more antenna of the terminal device 1504, and an antenna port may or may not corresponds to a physical antenna.

The non-transitory machine-readable storage media 1549 may contain software 1550, which includes the PUCCH format adjuster 1314 that performs operations performed by a terminal device as discussed to FIGS. 5-12.

Additionally, a terminal device may optionally further include input/output (I/O) devices such as display control and/or display device unit, video I/O device unit(s), audio I/O device unit(s), and other I/O device units.

Figure 16:
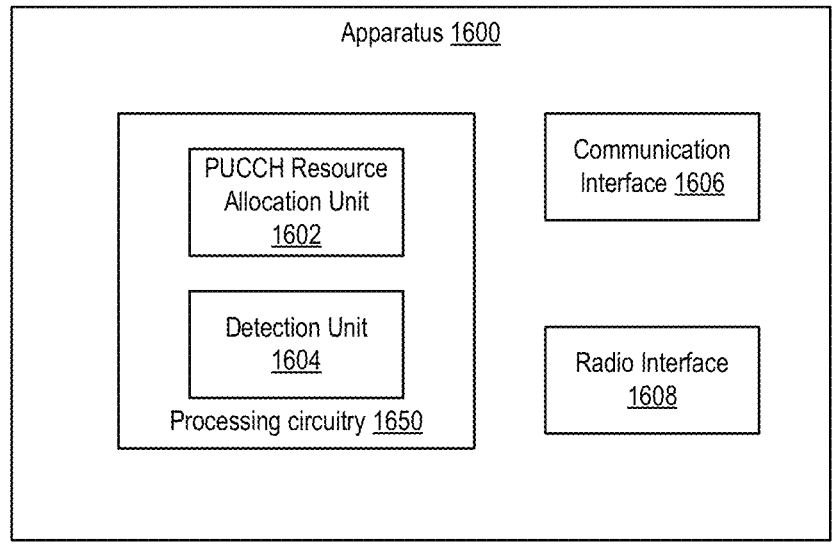
FIG. 16 illustrates a schematic block diagram of an apparatus in a wireless communication network for communicating with a terminal per an embodiment of the present disclosure.

FIG. 16 illustrates a schematic block diagram of an apparatus 1600 in a wireless communication network (e.g., the wireless communication system 1300 shown in FIG. 13) for communicating with a terminal device (e.g., terminal device 254) per an embodiment of the present disclosure. The apparatus may be implemented as/in a network device, e.g., the network device 252. The apparatus 1900 is operable to carry out operations by the network device 252 with reference to FIGS. 5-12.

The apparatus 1600 includes a radio interface 1608, a communication interface 1606, and a processing circuitry 1650. The radio interface 1608 is the interface through which the apparatus 1600 communicates with a terminal device. The communication interface 1606 is the interface through which the apparatus 1600 may communicate with a cloud computer. For example, the apparatus may obtain one or more parameters and threshold sets within or similar to the ones in Table 402 from the cloud computer through the communication interface 1606.

The processing circuitry 1650 may include a detection unit 1604 and a PUCCH resource allocation unit 1602. The detection unit 1604 may detect the one or more events relating to reference 806 of FIG. 8. The PUCCH resource allocation unit 1602 may allocate radio resources for a terminal device to use one or more PUCCH format for a service.

Figure 17:
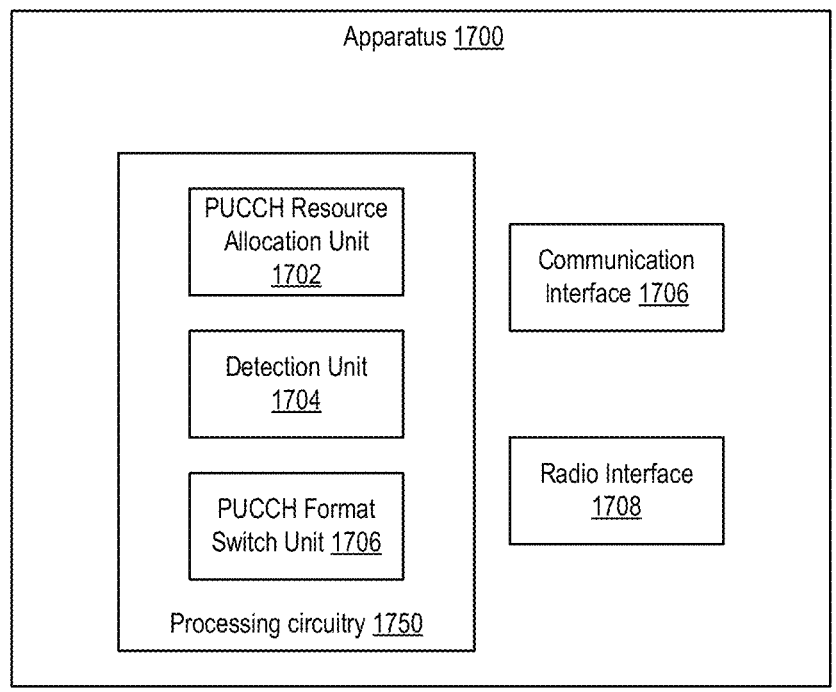
FIG. 17 illustrates a schematic block diagram of an apparatus in a wireless communication network for communicating with a network device per an embodiment of the present disclosure.

FIG. 17 illustrates a schematic block diagram of an apparatus 1700 in a wireless communication network (e.g., the wireless communication system 1300 shown in FIG. 13) for communicating with a network device (e.g., network device 252) per an embodiment of the present disclosure. The apparatus may be implemented as/in a terminal device, e.g., the terminal device 254. The apparatus 1700 is operable to carry out operations by the terminal device 254 with reference to FIGS. 5-12.

Figure 18:
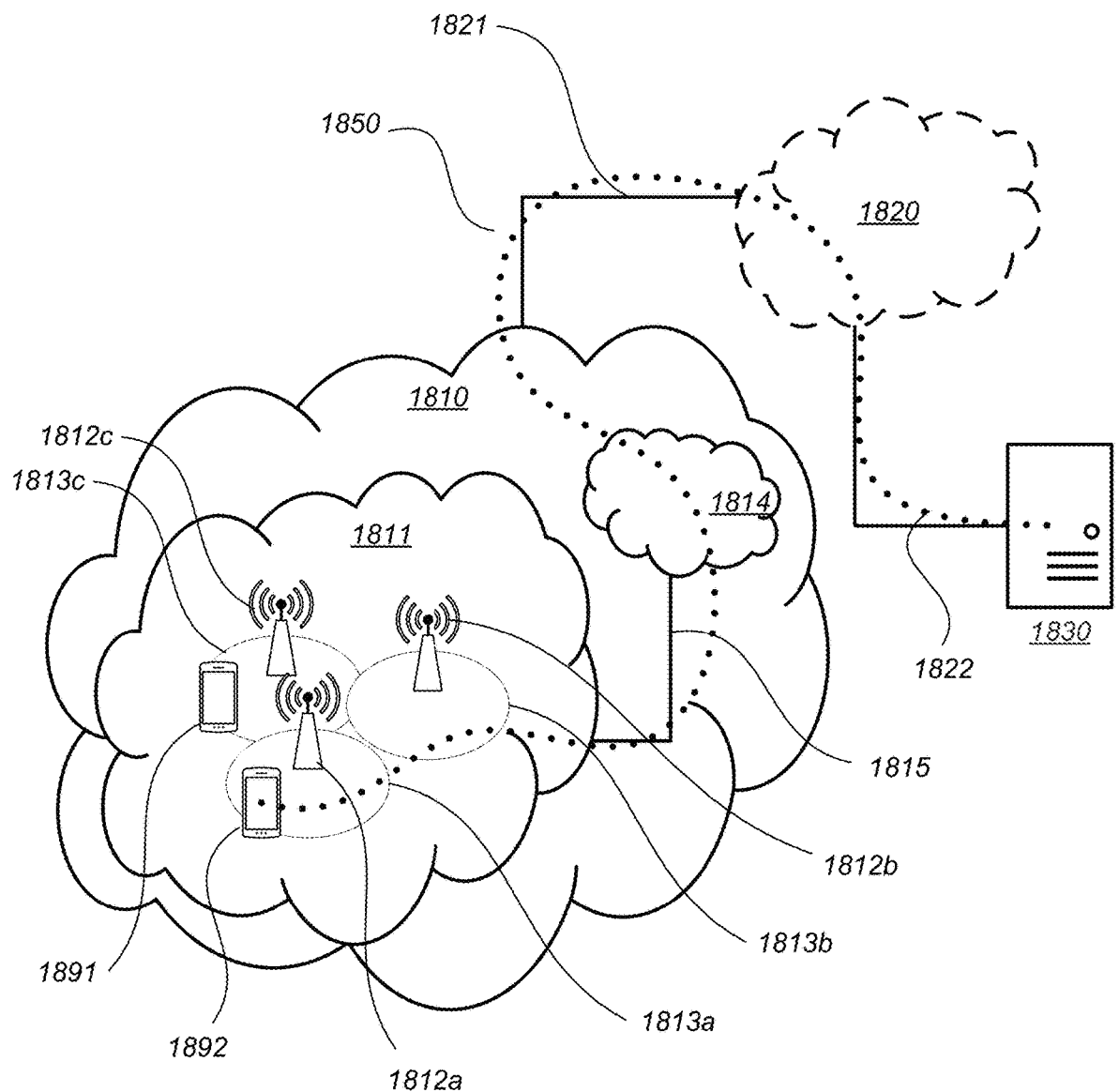
FIG. 18 schematically illustrates a telecommunication network connected via an intermediate network to a host computer.

FIG. 18 schematically illustrates a telecommunication network connected via an intermediate network to a host computer. With reference to FIG. 18, in accordance with an embodiment, a communication system includes a telecommunication network 1810, such as a 3GPP-type cellular network, which comprises an access network 1811, such as a radio access network, and a core network 1814. The access network 1811 comprises a plurality of base stations 1812a, 1812b, 1812c, such as NBs, eNBs, gNBs or other types of wireless access points, each defining a corresponding coverage area 1813a, 1813b, 1813c. Each base station 1812a, 1812b, 1812c is connectable to the core network 1814 over a wired or wireless connection 1815. A first user equipment (UE) 1891 located in coverage area 1813c is configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the corresponding base station 1812.

The telecommunication network 1810 is itself connected to a host computer 1830, which may be embodied in the hardware and/or software of a standalone server, a cloud-implemented server, a distributed server or as processing resources in a server farm. The host computer 1830 may be under the ownership or control of a service provider, or may be operated by the service provider or on behalf of the service provider. The connections 1821, 1822 between the telecommunication network 1810 and the host computer 1830 may extend directly from the core network 1814 to the host computer 1830 or may go via an optional intermediate network 1820. The intermediate network 1820 may be one of, or a combination of more than one of, a public, private or hosted network; the intermediate network 1820, if any, may be a backbone network or the Internet; in particular, the intermediate network 1820 may comprise two or more sub-networks (not shown).

The communication system of FIG. 18 as a whole enables connectivity between one of the connected UEs 1891, 1892 and the host computer 1830. The connectivity may be described as an over-the-top (OTT) connection 1850. The host computer 1830 and the connected UEs 1891, 1892 are configured to communicate data and/or signaling via the OTT connection 1850, using the access network 1811, the core network 1814, any intermediate network 1820 and possible further infrastructure (not shown) as intermediaries. The OTT connection 1850 may be transparent in the sense that the participating communication devices through which the OTT connection 1850 passes are unaware of routing of uplink and downlink communications. For example, a base station 1812 may not or need not be informed about the past routing of an incoming downlink communication with data originating from a host computer 1830 to be forwarded (e.g., handed over) to a connected UE 1891. Similarly, the base station 1812 need not be aware of the future routing of an outgoing uplink communication originating from the UE 1891 towards the host computer 1830.

Example implementations, in accordance with an embodiment, of the UE, base station and host computer discussed in the preceding paragraphs will now be described with reference to FIG. 19. In a communication system 1900, a host computer 1910 comprises hardware 1915 including a communication interface 1916 configured to set up and maintain a wired or wireless connection with an interface of a different communication device of the communication system 1900. The host computer 1910 further comprises processing circuitry 1918, which may have storage and/or processing capabilities. In particular, the processing circuitry 1918 may comprise one or more programmable processors, application-specific integrated circuits, field programmable gate arrays or combinations of these (not shown) adapted to execute instructions. The host computer 1910 further comprises software 1911, which is stored in or accessible by the host computer 1910 and executable by the processing circuitry 1918. The software 1911 includes a host application 1912. The host application 1912 may be operable to provide a service to a remote user, such as a UE 1930 connecting via an OTT connection 1950 terminating at the UE 1930 and the host computer 1910. In providing the service to the remote user, the host application 1912 may provide user data which is transmitted using the OTT connection 1950. The OTT connection 1950 may request the UE 1930 to allocate radio resources to one or more PUCCH format for a service in one embodiment.

The communication system 1900 further includes a base station 1920 provided in a telecommunication system and comprising hardware 1925 enabling it to communicate with the host computer 1910 and with the UE 1930. The hardware 1925 may include a communication interface 1926 for setting up and maintaining a wired or wireless connection with an interface of a different communication device of the communication system 1900, as well as a radio interface 1927 for setting up and maintaining at least a wireless connection 1970 with a UE 1930 located in a coverage area (not shown in FIG. 19) served by the base station 1920. The communication interface 1926 may be configured to facilitate a connection 1960 to the host computer 1910. The connection 1960 may be direct or it may pass through a core network (not shown in FIG. 19) of the telecommunication system and/or through one or more intermediate networks outside the telecommunication system. In the embodiment shown, the hardware 1925 of the base station 1920 further includes processing circuitry 1928, which may comprise one or more programmable processors, application-specific integrated circuits, field programmable gate arrays or combinations of these (not shown) adapted to execute instructions. The base station 1920 further has software 1921 stored internally or accessible via an external connection. The processing circuitry 1928 may execute the PUCCH format controller 1312 stored in the software 1921 in one embodiment. The processing circuity 1928 may comprise the processing circuitry 1650 in one embodiment.

The communication system 1900 further includes the UE 1930 already referred to. Its hardware 1935 may include a radio interface 1937 configured to set up and maintain a wireless connection 1970 with a base station serving a coverage area in which the UE 1930 is currently located. The hardware 1935 of the UE 1930 further includes processing circuitry 1938, which may comprise one or more programmable processors, application-specific integrated circuits, field programmable gate arrays or combinations of these (not shown) adapted to execute instructions. The UE 1930 further comprises software 1931, which is stored in or accessible by the UE 1930 and executable by the processing circuitry 1938. The processing circuitry 1938 may execute the PUCCH format adjuster 1314 stored in the software 1931 in one embodiment. The processing circuitry 1938 may comprise the processing circuitry 1750 in one embodiment. The software 1931 includes a client application 1932. The client application 1932 may be operable to provide a service to a human or non-human user via the UE 1930, with the support of the host computer 1910. In the host computer 1910, an executing host application 1912 may communicate with the executing client application 1932 via the OTT connection 1950 terminating at the UE 1930 and the host computer 1910. In providing the service to the user, the client application 1932 may receive request data from the host application 1912 and provide user data in response to the request data. The OTT connection 1950 may transfer both the request data and the user data. The client application 1932 may interact with the user to generate the user data that it provides.

Figure 19:
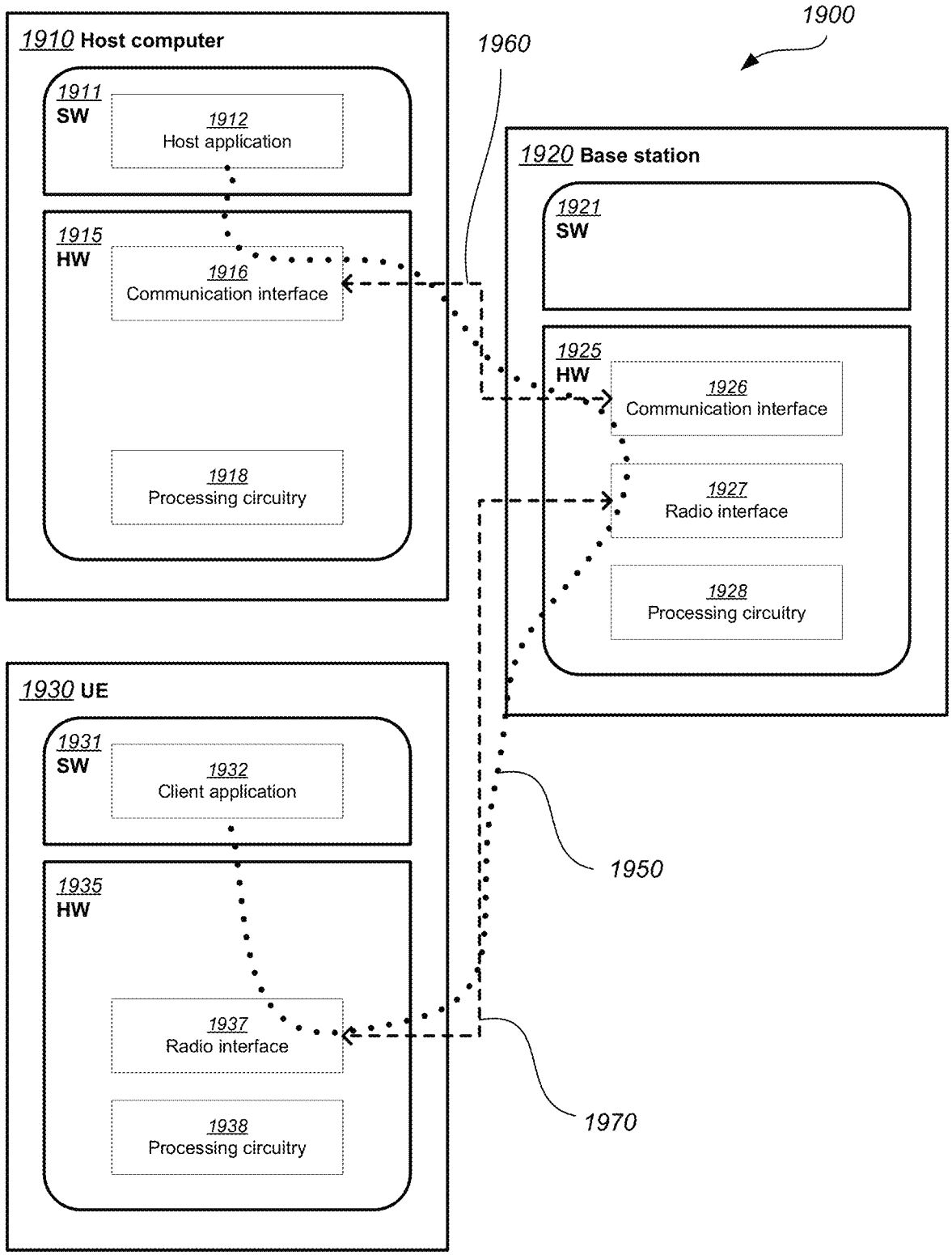
FIG. 19 illustrates a communication system per an embodiment of the present disclosure.

It is noted that the host computer 1910, base station 1920 and UE 1930 illustrated in FIG. 19 may be identical to the host computer 3230, one of the base stations 3212*a*, 3212*b*, 3212*c* and one of the UEs 3291, 3292 of FIG. 32, respectively. This is to say, the inner workings of these entities may be as shown in FIG. 18 and independently, the surrounding network topology may be that of FIG. 18.

In FIG. 19, the OTT connection 1950 has been drawn abstractly to illustrate the communication between the host computer 1910 and the use equipment 1930 via the base station 1920, without explicit reference to any intermediary devices and the precise routing of messages via these devices. Network infrastructure may determine the routing, which it may be configured to hide from the UE 1930 or from the service provider operating the host computer 1910, or both. While the OTT connection 1950 is active, the network infrastructure may further take decisions by which it dynamically changes the routing (e.g., on the basis of load balancing consideration or reconfiguration of the network).

The wireless connection 1970 between the UE 1930 and the base station 1920 is in accordance with the teachings of the embodiments described throughout this specification. One or more of the various embodiments improve the performance of OTT services provided to the UE 1930 using the OTT connection 1950, in which the wireless connection 1970 forms the last segment. More precisely, the teachings of these embodiments may improve the robustness of a PUCCH and thereby provide benefits such as quicker PUCCH format update, better cellular coverage, and/or less communication overhead of a PUCCH.

A measurement procedure may be provided for the purpose of monitoring data rate, latency and other factors on which the one or more embodiments improve. There may further be an optional network functionality for reconfiguring the OTT connection 1950 between the host computer 1910 and UE 1930, in response to variations in the measurement results. The measurement procedure and/or the network functionality for reconfiguring the OTT connection 1950 may be implemented in the software 1911 of the host computer 1910 or in the software 1931 of the UE 1930, or both. In embodiments, sensors (not shown) may be deployed in or in association with communication devices through which the OTT connection 1950 passes; the sensors may participate in the measurement procedure by supplying values of the monitored quantities exemplified above, or supplying values of other physical quantities from which software 1911, 1931 may compute or estimate the monitored quantities. The reconfiguring of the OTT connection 1950 may include message format, retransmission settings, preferred routing etc.; the reconfiguring need not affect the base station 1920, and it may be unknown or imperceptible to the base station 1920. Such procedures and functionalities may be known and practiced in the art. In certain embodiments, measurements may involve proprietary UE signaling facilitating the host computer's 1910 measurements of throughput, propagation times, latency and the like. The measurements may be implemented in that the software 1911, 1931 causes messages to be transmitted, in particular empty or 'dummy' messages, using the OTT connection 1950 while it monitors propagation times, errors, etc.

FIG. 20 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 20 will be included in this section. In a first step 2010 of the method, the host computer provides user data. In an optional substep 2011 of the first step 2010, the host computer provides the user data by executing a host application. In a second step 2020, the host computer initiates a transmission carrying the user data to the UE. In an optional third step 2030, the base station transmits to the UE the user data which was carried in the transmission that the host computer initiated, in accordance with the teachings of the embodiments described throughout this disclosure. In an optional fourth step 2040, the UE executes a client application associated with the host application executed by the host computer.

FIG. 21 is a flowchart illustrating a method implemented in a communication system, in accordance with an embodiment. The communication system includes a host computer, a base station and a UE which may be those described with reference to FIGS. 18 and 19. For simplicity of the present disclosure, only drawing references to FIG. 21 will be included in this section. In a first step 2110 of the method, the host computer provides user data. In an optional substep (not shown) the host computer provides the user data by executing a host application. In a second step 2120, the host computer initiates a transmission carrying the user data to the UE. The transmission may pass via the base station, in accordance with the teachings of the embodiments described throughout this disclosure. In an optional third step 2130, the UE receives the user data carried in the transmission.

Figures 22, 23:
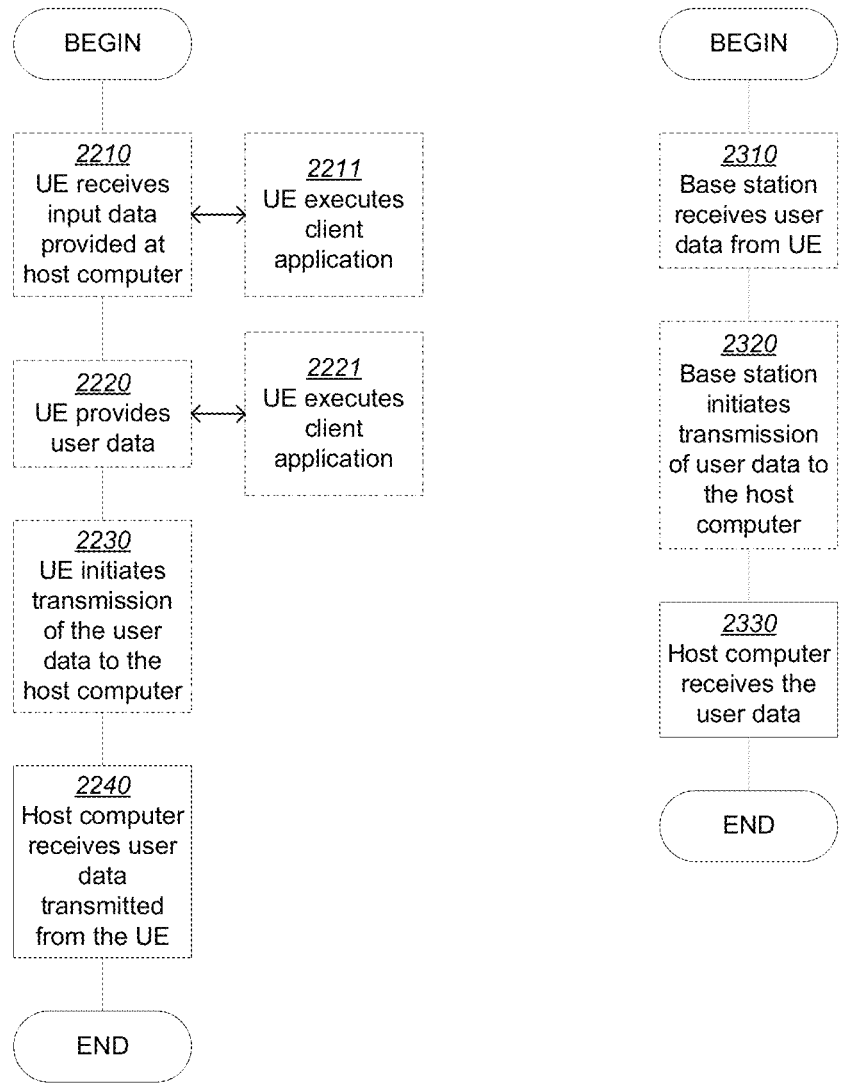
FIG. 22 is a flowchart illustrating a method implemented in a communication system, in accordance with an embodiment.
FIG. 23 is a flowchart illustrating a method implemented in a communication system, in accordance with an embodiment.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In an optional first step 2210 of the method, the UE receives input data provided by the host computer. Additionally or alternatively, in an optional second step 2220, the UE provides user data. In an optional substep 2221 of the second step 2220, the UE provides the user data by executing a client application. In a further optional substep 2211 of the first step 2210, the UE executes a client application which provides the user data in reaction to the received input data provided by the host computer. In providing the user data, the executed client application may further consider user input received from the user. Regardless of the specific manner in which the user data was provided, the UE initiates, in an optional third substep 2230, transmission of the user data to the host computer. In a fourth step 2240 of the method, the host computer receives the user data transmitted from the UE, in accordance with the teachings of the embodiments described throughout this disclosure.

FIG. 23 is a flowchart illustrating a method implemented in a communication system, in accordance with an embodiment. The communication system includes a host computer, a base station and a UE which may be those described with reference to FIGS. 18 and 19. For simplicity of the present disclosure, only drawing references to FIG. 23 will be included in this section. In an optional first step 2310 of the method, in accordance with the teachings of the embodiments described throughout this disclosure, the base station receives user data from the UE. In an optional second step 2320, the base station initiates transmission of the received user data to the host computer. In a third step 2330, the host computer receives the user data carried in the transmission initiated by the base station While the present disclosure has been described in terms of several embodiments, those skilled in the art will recognize that the present disclosure is not limited to the embodiments described, can be practiced with modification and alteration within the spirit and scope of the appended claims. The description is thus to be regarded as illustrative instead of limiting.

Supplementary Embodiments

1. A communication system including a host computer comprising:
   a processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to:
   cause the UE to use a first PUCCH format having a first duration (e.g., measured in a number of time units) for a service between the UE and the base station;
   cause the UE to use a second PUCCH format having a second and different duration (e.g., measured in another number of time units) for the service of the UE responsive to a determination that the first PUCCH format is in need of change based on one or more events.

2. The communication system according to embodiment 1, further including the base station.
3. The communication system according to embodiment 2, further including the UE, wherein the UE is configured to communicate with the base station.
4. The communication system according to embodiment 3, wherein:
   the processing circuitry of the host computer is configured to execute a host application, thereby providing the user data; and
   the UE comprises processing circuitry configured to execute a client application associated with the host application.
5. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs:
   causing the UE to use a first PUCCH format having a first duration (e.g., measured in a number of time units) for a service between the UE and the base station; and
   causing the UE to use a second PUCCH format having a second and different duration (e.g., measured in another number of time units) for the service of the UE responsive to a determination that the first PUCCH format is in need of change based on one or more events.
6. The method according to embodiment 5, further comprising:
   at the base station, transmitting the user data.
7. The method according to embodiment 6, wherein the user data is provided at the host computer by executing a host application, the method further comprising:
   at the UE, executing a client application associated with the host application, and the client application includes the PUCCH format adjuster.
8. A user equipment (UE) configured to communicate with a base station, the UE comprising a radio interface and processing circuitry configured to:
   use a first PUCCH format having a first duration (e.g., measured in a number of time units) for a service between the UE and a network device, and
   use a second PUCCH format having a second and different duration (e.g., measured in another number of time units) for the service of the UE responsive to a determination that the first PUCCH format is in need of change based on one or more events.
9. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to:
   use a first PUCCH format having a first duration (e.g., measured in a number of time units) for a service between the UE and a base station, and
   use a second PUCCH format having a second and different duration (e.g., measured in another number of time units) for the service of the UE responsive to a determination that the first PUCCH format is in need of change based on one or more events.
10. The communication system according to embodiment 9, further including the UE.
11. The communication system according to embodiment 10, wherein the cellular network further includes the base station configured to communicate with the UE.
12. The communication system according to embodiment 10 or 11, wherein:
    the processing circuitry of the host computer is configured to execute a host application, thereby providing the user data; and
    the UE's processing circuitry is configured to execute a client application associated with the host application, and the client application includes the PUCCH format adjuster 1314.
13. A method implemented in a user equipment (UE), comprising:
    using (804) a first PUCCH format having a first duration (e.g., measured in a number of time units) for a service between the UE and the network device;
    using (806) a second PUCCH format having a second and different duration (e.g., measured in another number of time units) for the service of the UE responsive to a determination that the first PUCCH format is in need of change based on one or more events.
14. The method according to embodiment 13, further comprising:
    providing user data; and
    forwarding the user data to a host computer via the transmission to the base station
15. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs:
    using (804) a first PUCCH format having a first duration (e.g., measured in number of time units) for a service between the UE and the base station;
    using (806) a second PUCCH format having a second and different duration (e.g., measured in another number of time units) for the service of the UE responsive to a determination that the first PUCCH format is in need of change based on one or more events.
16. The method according to embodiment 15, further comprising:
    at the UE, receiving the user data from the base station.
17. A user equipment (UE) configured to communicate with a base station, the UE comprising a radio interface and processing circuitry configured to:
    use a first PUCCH format having a first duration (e.g., measured in a number of time units) for a service between the UE and the base station, and
    use a second PUCCH format having a second and different duration (measured in another number of time units) for the service of the UE responsive to a determination that the first PUCCH format is in need of change based on one or more events.
18. A communication system including a host computer comprising:

a communication interface configured to receive user data originating from a transmission from a user equipment (UE) to a base station,
wherein the UE comprises a radio interface and processing circuitry, the UE's processing circuitry configured to:
use a first PUCCH format having a first duration (e.g., measured in a number of time units) for a service between the UE and the base station, and
use a second PUCCH format having a second and different duration (e.g., measured in another number of time units) for the service of the UE responsive to a determination that the first PUCCH format is in need of change based on one or more events.

19. The communication system according to embodiment 18, further including the UE.

20. The communication system according to embodiment 19, further including the base station, wherein the base station comprises a radio interface configured to communicate with the UE and a communication interface configured to forward to the host computer the user data carried by a transmission from the UE to the base station.

21. The communication system according to embodiment 19 or 20, wherein:
the processing circuitry of the host computer is configured to execute a host application; and
the UE's processing circuitry is configured to execute a client application associated with the host application, thereby providing the user data.

22. A method implemented in a communication system including a host computer, a base station and a user equipment (UE), the method comprising:
at the host computer, receiving user data transmitted to the base station from the UE, wherein the UE performs:
using (804) a first PUCCH format having a first duration (e.g., measured in a number of time units) for a service between the UE and the base station;
using (806) a second PUCCH format having a second and different duration (e.g., measured in another number of time units) for the service of the UE responsive to a determination that the first PUCCH format is in need of change based on one or more events.

23. The method according to embodiment 22, further comprising:
at the UE, providing the user data to the base station.

24. The method according to embodiment 23, further comprising:
at the UE, executing a client application, thereby providing the user data to be transmitted,
wherein the client application includes the PUCCH format adjuster; and
at the host computer, executing a host application associated with the client application.

25. The method according to embodiment 23, further comprising:
at the UE, executing a client application, wherein the client application includes the PUCCH format adjuster; and
at the UE, receiving input data to the client application, the input data being provided at the host computer by executing a host application associated with the client application,
wherein the user data to be transmitted is provided by the client application in response to the input data.

26. A base station configured to communicate with a user equipment (UE), the base station comprising a radio interface and processing circuitry configured to:
cause the terminal device to use a first PUCCH format having a first duration (e.g., measured in a number of time units) for a service between the UE and the base station; and
cause the UE to use a second PUCCH format having a second and different duration (e.g., measured in another number of time units) for the service of the UE responsive to a determination that the first PUCCH format is in need of change based on one or more events.

27. A communication system including a host computer comprising a communication interface configured to receive user data originating from a transmission from a user equipment (UE) to a base station, wherein the base station comprises a radio interface and processing circuitry, the base station's processing circuitry configured to:
cause the UE to use a first PUCCH format having a first duration (e.g., measured in a number of time units) for a service between the UE and the base station; and
cause the UE to use a second PUCCH format having a second and different duration (e.g., measured in another number of time units) for the service of the UE responsive to a determination that the first PUCCH format is in need of change based on one or more events.

28. The communication system according to embodiment 27, further including the base station.

29. The communication system according to embodiment 28, further including the UE, wherein the UE is configured to communicate with the base station.

30. The communication system according to embodiment 29, wherein:
the processing circuitry of the host computer is configured to execute a host application;
the UE is configured to execute a client application associated with the host application, thereby providing the user data to be received by the host computer.

31. A method implemented in a base station, comprising:
causing a terminal device to use a first PUCCH format having a first duration (e.g., measured in number of time units) for a service between the terminal device and the base station; and
causing the terminal device to use a second PUCCH format having a second and different duration (e.g., measured in another number of time units) for the service of the terminal device responsive to a determination that the first PUCCH format is in need of change based on one or more events.

32. A method implemented in a communication system including a host computer, a base station and a user equipment (UE), the method comprising:
at the host computer, receiving, from the base station, user data originating from a transmission which the base station has received from the UE, wherein the UE performs:
using (802) a first PUCCH format having a first duration (e.g., measured in a number of time units) for a service between the UE and the base station;
using (804) a second PUCCH format having a second and different duration (e.g., measured in another number of time units) for the service of the UE responsive to a determination that the first PUCCH format is in need of change based on one or more events.

33. The method according to embodiment 32, further comprising:
at the base station, receiving the user data from the UE.

34. The method according to embodiment 33, further comprising:
at the base station, initiating a transmission of the received user data to the host computer.

What is claimed is:

1. A method comprising:
using a first physical uplink control channel (PUCCH) format having a first duration in an uplink transmission for a service from a user equipment (UE) to a network device in a wireless communication network; and
switching from the first PUCCH format to a second PUCCH format that has a second and different duration for the service in response to one or more events, the one or more events comprising that one or more radio channel quality measurements crossing one or more corresponding threshold values, wherein the UE is to indicate to the network device the second PUCCH format responsive to the switching from the first PUCCH format to the second PUCCH format.

2. The method of claim 1, wherein each of the first and second durations comprises one of:
one to two symbols, and
four to fourteen symbols.

3. The method of claim 1, wherein switching from the first PUCCH format to the second PUCCH format is performed without reestablishing uplink synchronization between the UE and the network device.

4. The method of claim 1, wherein switching from the first PUCCH format to the second PUCCH format is performed without initiation of a random-access channel (RACH) process.

5. The method of claim 1, wherein the service one of an ultra-reliable and low latency communication service, an enhanced mobile broadband service, and a massive machine type communication service.

6. The method of claim 1, wherein the one or more events on which the switching is based comprise a determination of received signal strength.

7. The method of claim 1, wherein the one or more events on which the switching is based comprise a determination of a channel quality of a control signaling channel or a data transmission channel.

8. The method of claim 7, the channel quality is indicated through uplink control information (UCI).

9. The method of claim 1, wherein the one or more events on which the switching is based comprise a determination of a discontinuous transmission (DTX) measurement or a discontinuous reception (DRX) measurement.

10. The method of claim 1, wherein the one or more events on which the switching is based comprise a determination of failure of the first PUCCH format.

11. The method of claim 1, wherein the one or more events on which the switching is based comprise a determination of a transmission phase change.

12. A user equipment (UE), comprising:
a non-transitory machine-readable storage medium to store instructions; and
a processor coupled with the non-transitory machine-readable storage medium to process the stored instructions, causing the processor to perform:
using a first physical uplink control channel (PUCCH) format having a first duration in an uplink transmission for a service from the UE to a network device in a wireless communication network; and
switching from the first PUCCH format to a second PUCCH format that has a second and different duration for the service in response to one or more events, the one or more events comprising that one or more radio channel quality measurements crossing one or more corresponding threshold values, wherein the UE is to indicate to the network device the second PUCCH format responsive to the switching from the first PUCCH format to the second PUCCH format.

13. The UE of claim 12, switching from the first PUCCH format to the second PUCCH format is performed without reestablishing uplink synchronization between the UE and the network device.

14. The UE of claim 12, wherein the one or more events on which the switching is based comprise a determination of received signal strength.

15. The UE of claim 12, wherein the one or more events on which the switching is based comprise a determination of a channel quality of a control signaling channel or a data transmission channel.

16. The UE of claim 12, wherein the one or more events on which the switching is based comprise a determination of a discontinuous transmission (DTX) measurement or a discontinuous reception (DRX) measurement.

17. The UE of claim 12, wherein the one or more events on which the switching is based comprise a determination of a transmission phase change.

18. A non-transitory machine-readable storage medium to store instructions that when executed by a processor, causing the processor to perform:
using a first physical uplink control channel (PUCCH) format having a first duration in an uplink transmission for a service from a user equipment (UE) to a network device in a wireless communication network; and
switching from the first PUCCH format to a second PUCCH format that has a second and different duration for the service in response to one or more events, the one or more events comprising that one or more radio channel quality measurements crossing one or more corresponding threshold values, wherein the UE is to indicate to the network device the second PUCCH format responsive to the switching from the first PUCCH format to the second PUCCH format.

19. The non-transitory machine-readable storage medium of claim 18, wherein the one or more events on which the switching is based comprise a determination of received signal strength.

20. The non-transitory machine-readable storage medium of claim 18, wherein the one or more events on which the switching is based comprise a determination of a transmission phase change.

* * * * *